United States Patent
Sato

(10) Patent No.: US 11,613,235 B2
(45) Date of Patent: Mar. 28, 2023

(54) ON-BOARD SENSOR CLEANING APPARATUS AND ONBOARD SENSOR CLEANING METHOD

(71) Applicant: TOYOTA JIDOSHA KABUSHIKI KAISHA, Toyota (JP)

(72) Inventor: Ryo Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 17/502,308

(22) Filed: Oct. 15, 2021

(65) Prior Publication Data

US 2022/0153235 A1    May 19, 2022

(30) Foreign Application Priority Data

Nov. 17, 2020   (JP) .............................. JP2020-190628

(51) Int. Cl.
| | |
|---|---|
| B60S 1/56 | (2006.01) |
| B60R 1/00 | (2022.01) |
| G06V 20/56 | (2022.01) |
| G06V 20/59 | (2022.01) |
| B60R 11/04 | (2006.01) |

(52) U.S. Cl.
CPC ..................... B60S 1/56 (2013.01); B60R 1/00 (2013.01); B60R 11/04 (2013.01); G06V 20/56 (2022.01); G06V 20/597 (2022.01); B60R 2300/105 (2013.01); B60R 2300/8006 (2013.01)

(58) Field of Classification Search
None
See application file for complete search history.

(56) References Cited

U.S. PATENT DOCUMENTS

| | | | |
|---|---|---|---|
| 2019/0315353 A1* | 10/2019 | Dakemoto | ............... B60S 1/56 |
| 2020/0094784 A1* | 3/2020 | Herman | ............ G02B 27/0006 |
| 2020/0331435 A1* | 10/2020 | Dingli | ..................... B60R 11/04 |
| 2021/0229639 A1 | 7/2021 | Sato | |

FOREIGN PATENT DOCUMENTS

JP   2019-123262 A   7/2019

OTHER PUBLICATIONS

U.S. Appl. No. 17/007,409, filed Aug. 31, 2020.

* cited by examiner

Primary Examiner — Rebecca A Volentine
(74) Attorney, Agent, or Firm — Sughrue Mion, PLLC

(57) ABSTRACT

The on-board sensor cleaning apparatus is applied to a vehicle having a front camera, a rear camera, a center display, and an electronic inner mirror. A surrounding image obtained through the front camera and the rear camera is displayed on the center display and the electronic inner mirror. The on-board sensor cleaning apparatus includes an ECU, a position information obtaining device, and a cleaning unit. The ECU obtains a visual check probability for an area which includes a position of the vehicle indicated by vehicle position information, from a database. The ECU sets an automatic cleaning start condition based on the obtained visual check probability.

13 Claims, 14 Drawing Sheets

ON-BOARD SENSOR CLEANING APPARATUS AND ONBOARD SENSOR CLEANING METHOD

TECHNICAL FIELD

The present disclosure relates to an on-board sensor cleaning apparatus configured to clean a detecting surface part of an on-board sensor with cleaning fluid, the detecting surface part being a part through which a signal (e.g., electromagnetic wave such as visible light, laser light, infrared light, and electrical wave in millimeter waveband, and sonic wave) passes, wherein the signal is received by the on-board sensor.

BACKGROUND

Conventionally, a vehicle (host vehicle) equipped with an apparatus to assist a driver of the vehicle in easily monitoring surroundings of the vehicle has been known.

In one example of such a vehicle, an image of the surroundings of the vehicle acquired by a camera sensor serving as an on-board sensor is displayed on a display device. In another example of such a vehicle, surroundings monitoring assist information (e.g., information indicating that another vehicle is approaching the host vehicle) is displayed on a display device. The surroundings monitoring assist information is acquired by an on-board sensor such as a radar sensor, and an ultrasonic sound wave sensor.

Japanese Patent Application Laid-Open No. 2019-123262 discloses an on-board sensor cleaning apparatus (referred to as a "conventional apparatus") configured to clean a detecting surface part of an on-board sensor with cleaning fluid at regular intervals (i.e., an on-board sensor cleaning apparatus configured to execute an automatic cleaning (process) at regular intervals).

SUMMARY

When the on-board sensor is the camera sensor, the image of the surroundings of the vehicle acquired by the camera sensor may become blurred while the automatic cleaning is being executed, because the cleaning fluid is included in the image. When the on-board sensor is a sensor other than the camera sensor, detection accuracy of the on-board sensor is degraded due to the cleaning fluid used to clean the detecting surface part of the on-board sensor while the automatic cleaning is being executed, and thus, there may be a case where the surroundings monitoring assist information is inaccurate. Therefore, when the vehicle is in a position/location where the driver tends/needs to watch (look at or visually check) at least one of the surrounding image and the surroundings monitoring assist information, it is preferable that the automatic cleaning is not executed as much as possible.

However, as described above, the conventional apparatus executes the automatic cleaning at regular intervals. Accordingly, the conventional apparatus has a high possibility of executing the automatic cleaning when the vehicle is at the position/location where the driver tends/needs to watch at least one of the surrounding image and the surroundings monitoring assist information.

The present disclosure is made to cope with the problem described above. One of objectives of the present disclosure is to provide an on-board sensor cleaning apparatus (and an on-board sensor cleaning method) that has a low possibility of executing an automatic cleaning (process) of the on-board sensor, when the vehicle is at the position/location where the driver tends/needs to watch at least one of "an image and information" acquired using the on-board sensor. Hereinafter, the on-board sensor cleaning apparatus according to the present disclosure may sometimes be referred to as a "present disclosure cleaning apparatus", and the on-board sensor cleaning method according to the present disclosure may sometimes be referred to as a "present disclosure cleaning method."

The present disclosure cleaning apparatus is applied to a vehicle (SV). The vehicle (SV) includes an on-board sensor (11, 12) configured to obtain information representing surroundings of the vehicle based on electromagnetic wave or sonic wave which passes through a detecting surface part exposed to outside of the vehicle (SV), and a display device (20, 30) configured to display an image or displayed information produced based on the information obtained by the on-board sensor.

The present disclosure cleaning apparatus comprises:

a cleaning unit (U1) configured to perform a cleaning process to clean the detecting surface part of the on-board sensor using cleaning fluid;

a position information obtaining device (14) configured to obtain vehicle position information indicating a position of the vehicle; and a control unit (10) configured to:

obtain a result of a determination of whether or not an automatic cleaning start condition is satisfied (steps 505 to 530), wherein the determination is made, using a storage device (60, 102) which has stored a piece of area position information capable of identifying a position of each of predetermined areas on a ground and a visual check probability correlating value correlated with a visual check probability that a driver of the vehicle visually checks the display device while the piece of area position information and the visual check probability correlating value being associated with each other, based on the visual check probability correlating value which corresponds to one of the areas which includes the position of the vehicle indicated by the vehicle position information obtained by the position information obtaining device; and control the cleaning unit in such a manner that the cleaning unit performs the cleaning process (step 535) when the result of the determination indicates that the automatic cleaning start condition is satisfied ("Yes" determination at step 530).

The present disclosure cleaning apparatus executes the cleaning process when the result of the determination as to whether or not the automatic cleaning start condition is satisfied indicates that the automatic cleaning start condition is satisfied. The automatic cleaning start condition is set/varied based on the visual check probability correlating value corresponding to the present position of the vehicle. Therefore, the present disclosure cleaning apparatus can decrease a frequency (possibility) of executing the automatic cleaning of the on-board sensor, when the vehicle is at the position where the driver tends/needs to watch at least one of "the image and the displayed information" produced using the on-board sensor.

In one of the embodiments of the present disclosure cleaning apparatus further comprises the storage device (60) mounted on the vehicle.

In this embodiment, the control unit is configured to:

obtain, based on the obtained vehicle position information, the visual check probability correlating value corresponding to one of the areas which includes the position of the vehicle, from the storage device (step 505-step 515);

set the automatic cleaning start condition based on the obtained visual check probability correlating value (step 520); and determine whether or not the automatic cleaning start condition becomes satisfied (step 530) so as to obtain the result of the determination.

According to the above-described embodiment, the automatic cleaning start condition is set/determined based on the visual check probability correlating value obtained from the storage device mounted on the vehicle. Thus, it becomes unlikely that the automatic cleaning for the on-board sensor is executed, when the vehicle is at the position where the driver tends/needs to watch at least one of "the image and the displayed information" produced using the on-board sensor.

One of the embodiments of the present disclosure cleaning apparatus further comprises a radio communication device (110) which is mounted on the vehicle and is configured to be capable of communicating with an information-processing equipment which is located outside of the vehicle and which includes the storage device (102).

In this embodiment, the control unit is configured to:

obtain, based on the obtained vehicle position information, the visual check probability correlating value corresponding to one of the areas which includes the position of the vehicle, from the storage device, by communicating with the information-processing equipment using the radio communication device; and obtain the result of the determination, by setting the automatic cleaning start condition based on the obtained visual check probability correlating value, and by determining whether or not the automatic cleaning start condition becomes satisfied.

According to the above-described embodiment, the automatic cleaning start condition is set/determined based on the visual check probability correlating value obtained from the storage device located outside of the vehicle through the radio communication device. Thus, it becomes unlikely that the automatic cleaning for the on-board sensor is executed, when the vehicle is at the position where the driver tends/needs to watch at least one of "the image and the displayed information" produced using the on-board sensor.

In one of the embodiments of the present disclosure cleaning apparatus, the on-board sensor is a camera sensor (11, 12) which is configured to take a picture of the surroundings of the vehicle using light as the electromagnetic wave to obtain image information as the information representing the surroundings of the vehicle.

In this case, the control unit is configured to:

obtain, based on the image information, a dirty degree indicating value indicating a degree of dirtiness of the detecting surface part of the on-board sensor; and determine whether or not the automatic cleaning start condition becomes satisfied by comparing the dirty degree indicating value and a cleaning threshold (step 530), set the cleaning threshold based on the obtained visual check probability correlating value so as to set the automatic cleaning start condition (step 520); and obtain the result of the determination which is indicating that the automatic cleaning start condition has become satisfied when the dirty degree indicating value is larger than the cleaning threshold ("Yes" determination at step 530).

According to the above-described embodiment, the cleaning threshold that is to be compared with the dirty degree indicating value is determined/varied based on the visual check probability correlating value. Thus, the automatic cleaning start condition can be set in accordance with the visual check probability. Accordingly, it becomes unlikely that the automatic cleaning for the on-board sensor is executed, when the vehicle is at the position where the driver tends/needs to watch at least one of "the image and the displayed information" produced using the on-board sensor.

In one of the embodiments of the present disclosure cleaning apparatus, the control unit is configured to vary the cleaning threshold in such a manner that the cleaning threshold is greater when the obtained visual check probability correlating value is a specific value than when the obtained visual check probability correlating value is smaller than the specific value, so as to set the automatic cleaning start condition (step 520).

According to the above-described embodiment, since the cleaning threshold which is to be compared with the dirty degree indicating value is determined/varied in the manner described above, the automatic cleaning start condition is harder to be satisfied as the visual check probability correlating value is greater. Accordingly, it becomes unlikely that the automatic cleaning for the on-board sensor is executed, when the vehicle is at the position where the driver tends/needs to watch at least one of "the image and the displayed information" produced using the on-board sensor.

In one of the embodiments of the present disclosure cleaning apparatus, the control unit is configured to vary the cleaning threshold (step 1015) so as to set the automatic cleaning start condition in such a manner that:

the cleaning threshold is equal to a first threshold when the obtained visual check probability correlating value is in a first range that is equal to or smaller than a first visual check probability correlating value; and the cleaning threshold is equal to a second threshold smaller than the first threshold when the obtained visual check probability correlating value is in a second range that is larger than the first visual check probability correlating value and smaller than a second visual check probability correlating value, and a change in the visual check probability correlating value indicates a tendency that the visual check probability correlating value is increasing ("Yes" determination at step 1010).

According to the above-described embodiment, the cleaning threshold which is to be compared with the dirty degree indicating value is determined/varied in the manner described above. Accordingly, a consumed amount of the cleaning fluid can be reduced. In addition, it can be easier for the automatic cleaning to be executed before the vehicle reaches an area where the visual check probability correlating value is very high.

One of the embodiments of the present disclosure cleaning apparatus further comprises a driver's information obtaining device (13) configured to obtain driver's information that is used for determining a state of the driver.

In this case, the control unit is configured to prohibit executing the cleaning process while it is determined, based on the driver's information, that the driver is visually checking the display device ("No" determination at step 1205, step 1210, step 1215, and "No" determination at step 530).

According to the above-described embodiment, the automatic cleaning can be surely prevented from being executed while the driver is looking at least one of "the image and the displayed information" produced using the on-board sensor.

One of the embodiments of the present disclosure cleaning apparatus further comprises a driver's information obtaining device configured to obtain driver's information that is used for determining a state of the driver.

In this case, the control unit is configured to:
make a visually-check-determination as to whether or not the driver has visually checked the display device, based on the driver's information (step 310);
identify one of the areas that includes a position at which a result of the visually-check-determination is obtained (step 410);
calculate the visual check probability correlating value for the identified one of the areas, based on the result of the visually-check-determination (step 425-step 445); and
store the calculated visual check probability correlating value in the storage device while associating the calculated visual check probability correlating value with the area position information indicating the identified one of the areas (step 450).

According to the above-described embodiment, the visually-check-determination as to whether or not the driver has visually checked the display device in the area where the vehicle has actually traveled is made, and the calculated visual check probability correlating value calculated based on the result of the visually-check-determination is stored in the storage device. Therefore, the above-described embodiment can store the visual check probability correlating value with high accuracy in the storage device.

The present disclosure cleaning method is applied to a vehicle (SV) that includes:
an on-board sensor (11, 12) configured to obtain information representing surroundings of the vehicle based on electromagnetic wave or sonic wave which passes through a detecting surface part exposed to outside of the vehicle;
a display device (20, 40) configured to display an image or displayed information produced based on the information obtained by the on-board sensor;
a cleaning unit (U1) configured to perform a cleaning process to clean the detecting surface part of the on-board sensor using cleaning fluid; and
a position information obtaining device (14) configured to obtain vehicle position information indicating a position of the vehicle.

The present disclosure cleaning method comprises:
a step (step 515) of obtaining a visual check probability correlating value corresponding to one of areas which includes a position of the vehicle indicated by the vehicle position information, using a storage device (60) which has stored a piece of area position information capable of identifying a position of each of predetermined areas on a ground and a visual check probability correlating value correlated with a visual check probability that a driver of the vehicle visually checks the display device while the piece of area position information and the visual check probability correlating value being associated with each other;
a step (step 520) of setting an automatic cleaning start condition based on the obtained visual check probability correlating value;
a step (step 530) of obtaining a result of a determination of whether or not the automatic cleaning start condition becomes satisfied; and
a step (step 535) of controlling the cleaning unit in such a manner that the cleaning performs the cleaning process when the result of the determination indicates that the automatic cleaning start condition is satisfied ("Yes" determination at step 530).

According to the present disclosure cleaning method, the cleaning process is executed when the result of the determination as to whether or not the automatic cleaning start condition is satisfied indicates that the automatic cleaning start condition is satisfied. The automatic cleaning start condition is set/varied based on the visual check probability correlating value corresponding to the present position of the vehicle. Therefore, the present disclosure cleaning method can decrease a frequency (possibility) of executing the automatic cleaning of the on-board sensor, when the vehicle is at the position where the driver tends/needs to watch at least one of "the image and the displayed information" produced using the on-board sensor.

One of the embodiments of the present disclosure cleaning method further includes:
a step (step 305, step 310) of obtaining driver's information that is used for determining a state of the driver;
a step (step 310) of making a determination as to whether or not the driver has visually checked the display device, based on the driver's information, and of (step 410) identifying one of the areas that includes a position at which a result of the determination is obtained;
a step (step 425-step 445) of calculating the visual check probability correlating value for the identified one of the areas, based on the result of the determination; and
a step (step 450) of storing the calculated visual check probability correlating value in the storage device while associating the calculated visual check probability correlating value with the area position information indicating the identified one of the areas.

According to the above-described embodiment, the visually-check-determination as to whether or not the driver has visually checked the display device in the area where the vehicle has actually traveled is made, and the calculated visual check probability correlating value calculated based on the result of the visually-check-determination is stored in the storage device. Therefore, the above-described embodiment can store the visual check probability correlating value with high accuracy in the storage device.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

First Embodiment

<Configuration>

Figure 1:
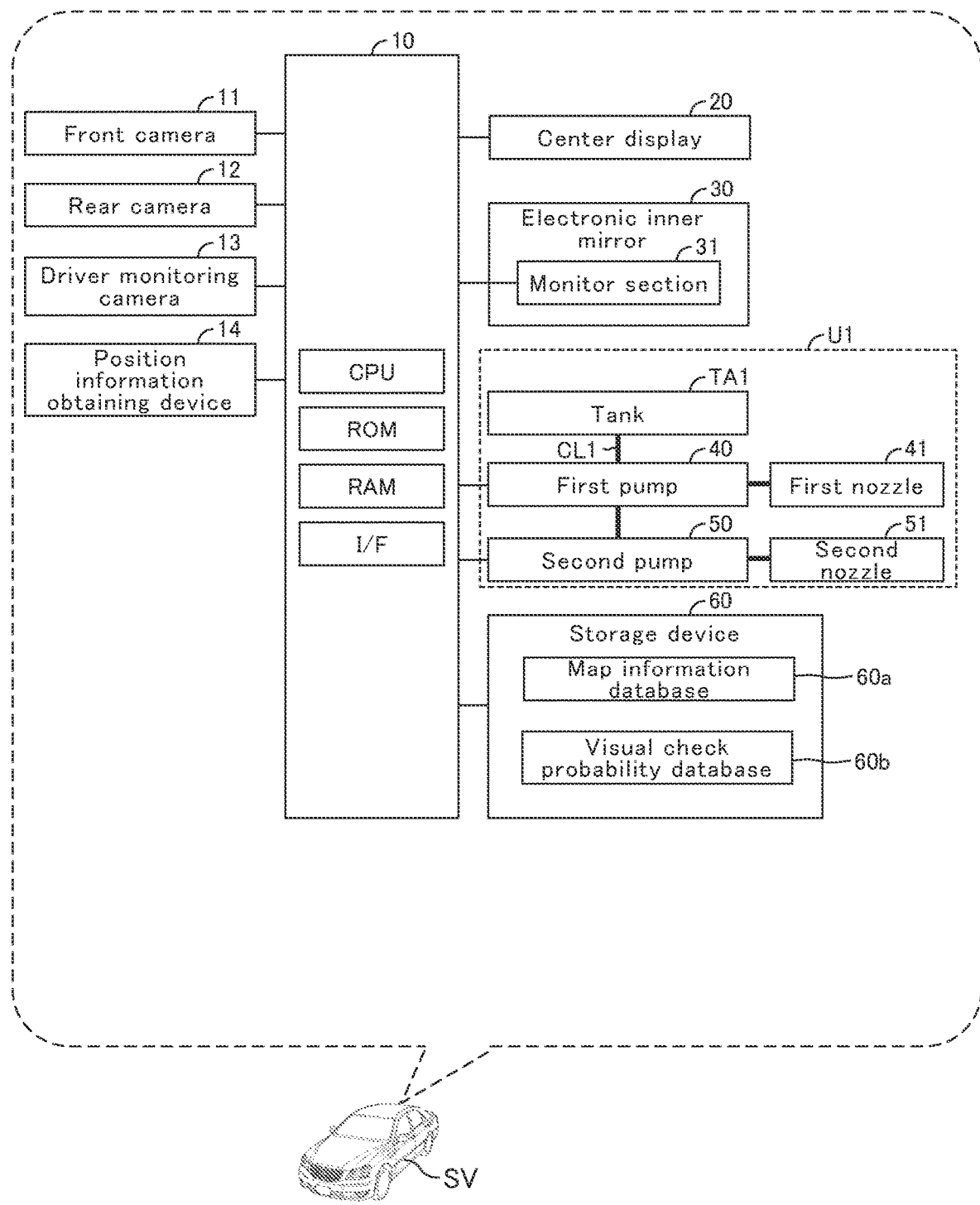
FIG. 1 is a schematic diagram of an on-board apparatus including a first cleaning apparatus according to an embodiment of the present disclosure.

As shown in FIG. 1, an on-board apparatus including an on-board sensor cleaning apparatus (hereinafter, sometimes referred to as a "first cleaning apparatus") according to a first embodiment of the present disclosure is mounted on a vehicle SV. The on-board apparatus comprises an ECU 10, a front camera 11, a rear camera 12, a driver monitoring camera 13, a position information obtaining device 14, a center display 20, an electronic inner mirror 30, a cleaning (washing) unit U1, and a storage device 60. The cleaning unit U1 includes a tank TA1, a first pump 40, a first nozzle 41, a second pump 50, and a second nozzle 51. The first cleaning apparatus includes the ECU 10, the driver monitoring camera 13, the position information obtaining device 14, the cleaning unit U1, and the storage device 60.

The ECU 10 is an electronic control unit that includes a microcomputer as a main component, and is sometimes referred to as a controller. The microcomputer includes a CPU, a ROM, a RAM, and an interface (I/F). The CPU is configured and/or programmed to realize various functions by executing instructions (or programs, or routines) stored in the ROM. The ECU 10 may be implemented by a plurality of ECUs.

The ECU 10 is connected to the front camera 11, the rear camera 12, the driver monitoring camera 13, and the position information obtaining device 14. Hereinafter, when the front camera 11 and the rear camera 12 need not be distinguished from each other, each of them is sometimes referred to as a "camera sensor (or a surroundings camera device)".

The front camera 11 is disposed at a center of a front end part of the vehicle SV. The front camera 11 is one of on-board sensors, and has a detecting surface part (detecting surface section) that is exposed to the outside of the vehicle SV. The front camera 11 includes a light receiving element. Visible light from an area in front of the vehicle SV corresponding to a shooting range of the front camera 11 is led to the light receiving element. The front camera 11 obtains (captures) image information (front image data) representing the area (scene) in front of the vehicle SV using the light receiving element. The front camera 11 transmits the obtained image information to the ECU 10. The ECU 10 produces a frontward surrounding image including an image corresponding to the shooting range, based on the image information that the ECU 10 receives. The frontward surrounding image functions as an image that assists the driver of the vehicle SV in monitoring the area (front area) in front/ahead of the vehicle SV.

The rear camera 12 is disposed at a center of a rear end part of the vehicle SV. The rear camera 12 is one of the on-board sensors, and has a detecting surface part (detecting surface section) that is exposed to the outside of the vehicle SV. The rear camera 12 includes a light receiving element. Visible light from an area in the rear of the vehicle SV corresponding to a shooting range of the rear camera 12 is led to the light receiving element. The rear camera 12 obtains (captures) image information (rear image data) representing the area (scene) in the rear of the vehicle SV using the light receiving element. The rear camera 12 transmits the obtained image information to the ECU 10. The ECU 10 produces a rearward surrounding image including an image corresponding to the shooting range, based on the image information that the ECU 10 receives. The rearward surrounding image functions as an image that assists the driver of the vehicle SV in monitoring the area (rear area) in the rear of the vehicle SV. When the front surrounding image and the rearward surrounding image need not to be distinguished from each other, each of them is sometimes referred to as a "surrounding image."

The driver monitoring camera 13 is disposed at a position from where the driver monitoring camera 13 can take a picture of a face of the driver sitting in a driver's seat of the vehicle SV. The driver monitoring camera 13 photographs a face of the driver that is present in its shooting range so as to produce a driver's image. The driver monitoring camera 13 transmits the obtained driver's image to the ECU 10. The ECU 10 produces/obtains a driver's information (e.g., information indicative of a driver's line of sight (driver's eye direction)) used to determine a state of the driver, based on the driver's image transmitted from the driver monitoring camera 13. The driver monitoring camera 13 is sometimes referred to as a "driver's information obtaining device", for convenience sake.

The position information obtaining device 14 includes a GNSS (Global Navigation Satellite System) receiver. The GNSS receiver receives signals (i.e., GNSS signals) transmitted from satellites included in the GNSS system for detecting a present/current position/location (hereinafter, referred to as a "present position") of the vehicle SV at the present time point. The position information obtaining device 14 obtains position information indicative of the present position of the vehicle SV. It should be noted that a position is represented (expressed) by latitude and longitude, for instance. The position information obtaining device 14 transmits the thus obtained position information to the ECU 10.

The ECU 10 is further connected to the center display 20, the electronic inner mirror 30, the first pump 40, the second pump 50, and the storage device 60.

The center display 20 is a touch panel screen that can display an image. The center display 20 is disposed in the vicinity of a center in a vehicle width direction of an unillustrated instrumental panel in a cabin of the vehicle SV. The ECU 10 displays the frontward surrounding image and/or the rearward surrounding image on the center display 20.

The electronic inner mirror 30 includes a monitor section (an inner mirror display) 31 configured to display an image. The monitor section 31 is disposed at a position such that the driver can look at the monitor section 31. For example, the monitor section 31 is disposed at a center upper position of a front windshield in the side of the cabin, the position at which a conventional inner mirror is disposed. The ECU 10 displays the rearward surrounding image on the monitor section 31 of the electronic inner mirror 30.

The first pump 40 is communicated with the tank TA1 via a fluid pipe CL1. The tank TA1 is a reservoir storing cleaning fluid. The first pump 40 is communicated with the first nozzle 41 via the fluid pipe CL1. The first nozzle 41 is disposed at a position from which the first nozzle 41 can inject the cleaning fluid toward the detecting surface part of the front camera 11.

A driving state of the first pump 40 is controlled by the ECU 10. When the first pump 40 is driven by the ECU 10, the first pump 40 sucks in the cleaning fluid through the fluid pipe CL1 and supplies the cleaning fluid to the first nozzle 41 so that the first nozzle 41 injects the cleaning fluid supplied from the tank TA1 to/toward the detecting surface part of the front camera 11. Namely, the ECU 10 can drive the first pump 40 to clean/wash the detecting surface part of the front camera 11.

The second pump 50 is communicated with the tank TA1 via the fluid pipe CL1. The second pump 50 is communicated with the second nozzle 51 via the fluid pipe CL1. The second nozzle 51 is disposed at a position from which the second nozzle 51 can inject the cleaning fluid toward the detecting surface part of the rear camera 12.

A driving state of the second pump 50 is controlled by the ECU 10. When the second pump 50 is driven by the ECU 10, the second pump 50 sucks in the cleaning fluid through the fluid pipe CL1 and supplies the cleaning fluid to the second nozzle 51 so that the second nozzle 51 injects the cleaning fluid supplied from the tank TA1 to/toward the detecting surface part of the rear camera 12. Namely, the ECU 10 can drive the second pump 50 to clean/wash the detecting surface part of the rear camera 12.

The storage device 60 is a non-volatile readable and writable storage/memory device (in the present example, a hard disc) configured such that data can be written into the storage device 60 and data can be read out from the storage device 60. The ECU 10 can store information in the storage device 60, and read information stored in the storage device 60 out from the storage device 60. The storage device 60 includes a map information database 60a and a visual check probability database (or visible contact probability database) 60b.

The map information database 60a has stored map information. The map information includes position information representing a position of each road (position information for each lane) and information to identify a shape of each road. The map information also includes information representing a width of each road, position information on each parking lot, each intersection, each road fork, and each traffic light.

In the visual check probability database 60b, area position information which identifies/specifies each position of "a plurality of areas ARj, described later" is stored. In addition, "a visual check probability (or visible contact probability) Prj, an accumulated number of confirmations NCj, and an accumulated number of determinations NDj" associated with each of the areas ARj are also stored in the visual check probability database 60b.

Figure 2:
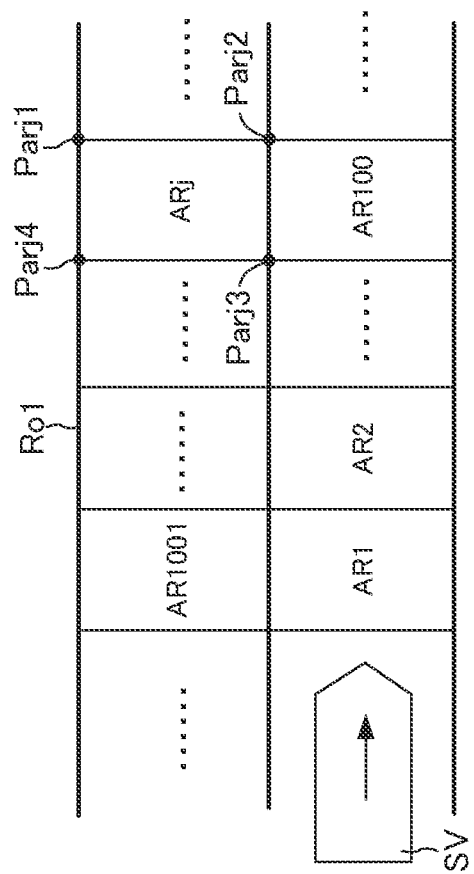
FIG. 2 is a top view of a road.

As shown in FIG. 2, a road(s) Ro1 on which the vehicle SV can travel, an unillustrated parking lot(s), and the like are divided in a plurality of the areas ARj, based on the map information. The area position information is position information that identifies/indicates a position of each of the areas ARj. The area ARj has a predetermined size and a predetermined shape (in the present example, a square shape). The area position information identifying the area ARj includes a "set of four pieces of position information" that identifies, using latitude and longitude, positions (Parj1, Parj2, Parj3, Parj4) of four vertexes of the square having the predetermined size corresponding to the area ARj, for instance.

The visual check probability Prj is a probability (visible check/contact probability) that the driver of the vehicle SV looks at (visually checks) at least one of the center display 20 and the electronic inner mirror 30, in the area ARj. The visual check probability Prj may be referred to as a "visual check probability correlating value" that is correlated with the visual check probability, and is larger as the visible check probability is higher. It should be noted that, hereinafter, when the center display 20 and the electronic inner mirror 30 need not to be distinguished from each other, each of them is referred to as a "display (display screen)" that is also sometimes referred to as a "display device" for convenience sake.

The accumulated number of confirmations NCj is an accumulated value (hereinafter, sometimes referred to as the "cumulative number") of times of a case where it is determined that the driver of the vehicle SV has looked at (visually checked) the display at least once while the vehicle SV passes through the area ARj. The accumulated number of determinations NDj is an accumulated value of times of a case where it is determined that the vehicle SV passed through the area ARj. In other words, the accumulated number of determinations NDj is an accumulated value of a case where the determination as to whether or not the driver of the vehicle SV has looked at (visually checked) the display at least once in the area ARj is made. It should be noted that initial values of the accumulated number of confirmations NCj and the accumulated number of determinations NDj are both set at "0". The visual check probability Prj is calculated by dividing the accumulated number of confirmations NCj by the accumulated number of determinations NDj (i.e., Prj=NCj/NDj).

<Outline of Cleaning Process>

The ECU 10 executes an automatic cleaning process for automatically cleaning/washing the detecting surface part of the front camera 11, when the ECU 10 determines that the detecting surface part of the front camera 11 has become dirty. Similarly, the ECU 10 executes an automatic cleaning process for automatically cleaning/washing the detecting surface part of the rear camera 12, when the ECU 10 determines that the detecting surface part of the rear camera 12 has become dirty.

More specifically, the ECU 10 obtains (detects) an index/indicating value (hereinafter, simply referred to as a "dirty degree indicating value") that indicates a degree of dirtiness of each of the detecting surface part of the front camera 11 and the detecting surface part of the rear camera 12. The ECU 10 obtains the dirty degree indicating value of the front camera 11 based on the frontward surrounding image, and obtains the dirty degree indicating value of the rear camera 12 based on the rearward surrounding image, as follows.

The dirty degree indicating value of the front camera 11 is a ratio expressed in percentage of an area of dirty portions in the frontward surrounding image to an entire area of the frontward surrounding image. Namely, the dirty degree indicating value of the front camera 11 is as follows.

> The dirty degree indicating value of the front camera 11=100·[(area of dirty portions in the frontward surrounding image)/(entire area of the frontward surrounding image)]

The dirty portion in the frontward surrounding image is a "portion (region) of the frontward surrounding image"

where a change in its luminance continues being equal to or smaller than a threshold for a predetermined time or longer. In other words, the dirty portion in the frontward surrounding image is a portion (region) having the luminance that does not substantially change in a plurality of the successive frontward surrounding images.

The dirty degree indicating value of the rear camera 12 is a ratio expressed in percentage of an area of dirty portions in the rearward surrounding image to an entire area of the rearward surrounding image. Namely, the dirty degree indicating value of the rear camera 12 is as follows.

The dirty degree indicating value of the rear camera 12=100·[(area of dirty portions in the rearward surrounding image)/(entire area of the rearward surrounding image)]

The dirty portion in the rearward surrounding image is a "portion (region) of the rearward surrounding image" where a change in its luminance continues being equal to or smaller than a threshold for a predetermined time or longer. In other words, the dirty portion in the rearward surrounding image is a portion (region) having the luminance that does not substantially change in a plurality of the successive rearward surrounding images.

As is apparent from the above, the dirty degree indicating value becomes greater as a proportion of the dirty portions in the image displayed on the display becomes higher.

The ECU 10 monitors (continue determining) whether or not an automatic cleaning start condition for the front camera 11 (hereinafter, the condition being referred to as a "Fr automatic cleaning start condition") becomes satisfied. The Fr automatic cleaning start condition becomes satisfied when the dirty degree indicating value of the front camera 11 becomes greater than a cleaning threshold thFr. When the ECU 10 determines that the Fr automatic cleaning start condition becomes satisfied, the ECU 10 start to drive the first pump 40 for a predetermined time length (first time length) to inject a predetermined amount of the cleaning fluid from the first nozzle 41 so as to clean (execute an automatic clean process for) the detecting surface part of the front camera 11.

The ECU 10 monitors (continue determining) whether or not an automatic cleaning start condition for the rear camera 12 (hereinafter, the condition being referred to as a "Rr automatic cleaning start condition") becomes satisfied. The Rr automatic cleaning start condition becomes satisfied when the dirty degree indicating value of the rear camera 12 becomes greater than a cleaning threshold thRr. When the ECU 10 determines that the Rr automatic cleaning start condition becomes satisfied, the ECU 10 start to drive the second pump 50 for a predetermined time length (second time length) to inject a predetermined amount of the cleaning fluid from the second nozzle 51 so as to clean (execute an automatic clean process for) the detecting surface part of the rear camera 12.

It should be noted that the cleaning threshold thFr and the cleaning threshold thRr are equal to each other, in the present example. Each of the cleaning threshold thFr and the cleaning threshold thRr is referred to as a "cleaning threshold th", hereinafter. Furthermore, each of the Fr automatic cleaning start condition and the Rr automatic cleaning start condition may be simply referred to as a "cleaning start condition", hereinafter. The cleaning threshold thFr and the cleaning threshold thRr may be different from each other. The first time length and the second time length are equal to each other, but may be different from each other.

<Outline of Operation>

While the automatic clean process for the detecting surface part of the front camera 11 is being executed, the cleaning fluid is injected to the detecting surface part of the front camera 11 so that the frontward surrounding image becomes blurred (unclear). When this happens, the driver may not be able to monitor the area in front of the vehicle SV by visually checking (looking at) the frontward surrounding image. Likewise, while the automatic clean process for the detecting surface part of the rear camera 12 is being executed, the cleaning fluid is injected to the detecting surface part of the rear camera 12 so that the rearward surrounding image becomes blurred (unclear). When this happens, the driver may not be able to monitor the area in the rear of the vehicle SV by visually checking (looking at) the rearward surrounding image.

In view of the above, it is preferable that the automatic clean process for the front camera 11 and the automatic clean process for the rear camera 12 be executed while the vehicle is located in an area ARj where there is a low possibility or a low need that the driver visually checks (looks at) the display in order to monitor the surroundings (the front area and/or the rear area) of the vehicle SV Meanwhile, it can be said that a "possibility that the driver visually checks the display (i.e., the surrounding image) in order to monitor the surroundings when the vehicle SV is in the area ARj" is lower, as the visual check probability Prj of that area ARj is lower. In other words, it can be said that a "possibility that the driver visually checks the display (i.e., the surrounding image) in order to monitor the surroundings when the vehicle SV is in the area ARj" is higher, as the visual check probability Prj of that area ARj is higher.

In view of the above, the first cleaning apparatus varies the cleaning threshold th in such a manner that the cleaning threshold th is smaller, as the visual check probability Prj of the area ARj in which the vehicle is located is lower. In other words, the first cleaning apparatus varies the cleaning threshold th in such a manner that the cleaning threshold th is larger, as the visual check probability Prj of the area ARj in which the vehicle is located/positioned is higher.

Accordingly, in the first cleaning apparatus, the cleaning start condition becomes satisfied more easily (i.e., the cleaning threshold th is smaller), as the visual check probability Prj of the area ARj in which the vehicle is located is lower. Therefore, a possibility that the automatic cleaning is executed is higher, when the vehicle SV is located in an area where a possibility that the driver visually checks (looks at) the surrounding image displayed on the display is relatively low.

Whereas, in the first cleaning apparatus, the cleaning start condition becomes satisfied more rarely (or harder to be satisfied) (i.e., the cleaning threshold th is larger), as the visual check probability Prj of the area ARj in which the vehicle is located/positioned is higher. Therefore, a possibility that the automatic cleaning is not executed is higher, when the vehicle SV is located in an area where a possibility that the driver visually checks (looks at) the surrounding image displayed on the display is relatively high.

<Specific Operation>

The CPU (hereinafter, simply referred to as the "CPU") of the ECU 10 executes each of routines shown by flowcharts in FIGS. 3 to 5, every time a predetermined time elapses.

Figure 3:
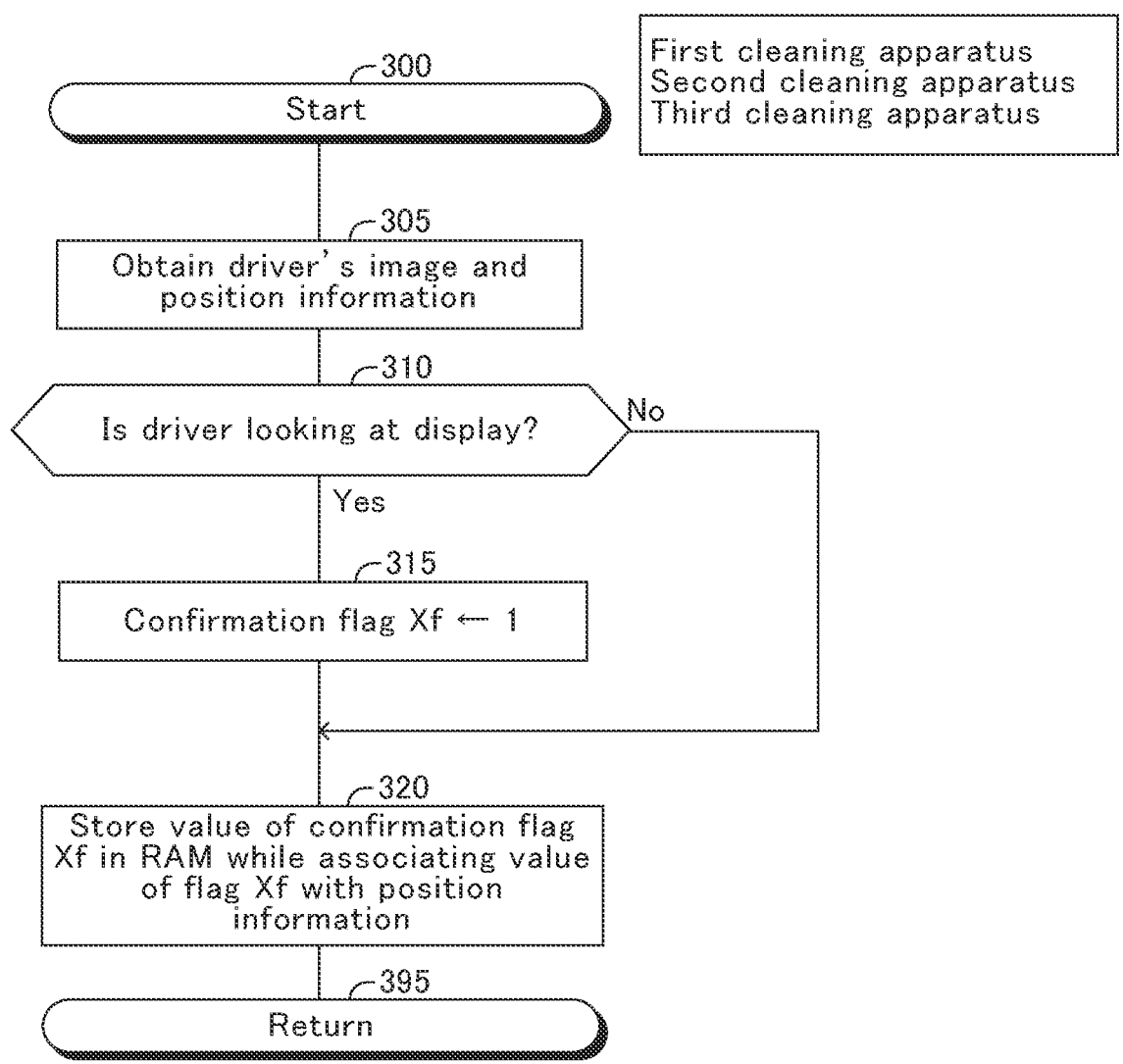
FIG. 3 is a flowchart showing a routine executed by a CPU of an ECU of each of the first to a third cleaning apparatus.

Accordingly, when an appropriate time comes, the CPU starts process of step 300 shown in FIG. 3, and proceeds to step 305. At step 305, the CPU obtains the driver's image from the driver monitoring camera 13, and obtains, from the position information obtaining device 14, the position information of the vehicle SV that was obtained when the driver's image was obtained by the driver monitoring camera 13.

Subsequently, the CPU proceeds to step 310 so as obtain, based on the driver's image, the driver's information (i.e., the information indicative of the driver's line of sight). Thereafter, the CPU determines, based on the thus obtained driver's line of sight, whether or not the driver is looking at (i.e., visually checking, or is in visual contact with) the display. More specifically, the CPU determines whether or not the driver's line of sight is directed in the direction of either the center display 20 or the electronic inner mirror 30. The CPU determines that the driver is looking at the display, when it is determined that the driver's line of sight is directed in the direction of either the center display 20 or the electronic inner mirror 30.

When the driver is looking at the display, the CPU makes a "Yes" determination at step 310, and proceeds to step 315 so as to set a value of a confirmation flag Xf at "1". When the value of the confirmation flag Xf is "1", the confirmation flag Xf indicates that the driver is looking at the display. When the value of the confirmation flag Xf is "0", the confirmation flag Xf indicates that the driver is not looking at the display. The value of the confirmation flag Xf is set to "0" through an initialization routine executed by the CPU when an unillustrated ignition key switch of the vehicle SV is changed from an off position to an on position. Furthermore, as described later, the value of the confirmation flag Xf is set to "0" when the position of the vehicle SV has changed from an Area ARj-1 to an area ARj (refer to step 435 shown in FIG. 4). Thereafter, the CPU proceeds to step 320.

Whereas, when the driver is not looking at the display, the CPU makes a "No" determination at step 310, and directly proceeds to step 320

At step 320, the CPU associate/correlates the value of the confirmation flag Xf with the position information obtained at step 305, and stores them in the RAM. Thereafter, the CPU proceeds to step 395 so as to terminate the present routine.

The CPU starts process of step 400 shown in FIG. 4 after executing the routine shown in FIG. 3, and sequentially executes "processes of step 405 and step 410" described below so as to proceed to step 415.

Step 405: the CPU reads out "the position information and the value of the confirmation flag Xf" stored in the RAM at step 320.

Step 410: the CPU identifies/specifies the area ARj that includes a position indicated by the position information obtained at step 405 by searching the visual check probability database 60b. In other words, the CPU identifies/specifies the area ARj that includes the position at which the vehicle SV is currently present and which is the position of the vehicle SV at the time point at which the driver's image was obtained.

At step 415, the CPU determines whether or not the area ARj identified at step 410 (i.e., the present area ARj) is different from a previous area ARj-1 that is the area ARj that was identified when the present routine was executed the predetermined time before. In other words, the CPU determines whether or not the vehicle SV has entered into a new area ARj (that is the present area ARj).

When the present area ARj is the same as the previous area ARj-1, the CPU makes a "No" determination at step 415, and directly proceeds to step 420 so as to store the present area ARj in the RAM as the previous area ARj-1. Thereafter, the CPU proceeds to step 495 so as to terminate the present routine tentatively.

When the CPU starts processing the present routine immediately after the vehicle SV has entered into the new area ARj, the CPU makes a "Yes" determination at step 415 following step 405 and step 410, and proceeds to step 425. At step 425, the CPU determines whether or not the value of the confirmation flag Xf is "1".

When the value of the confirmation flag Xf is "1", the CPU makes a "Yes" determination at step 425, and sequentially executes "processes of step 430 and step 435" described below so as to proceed to step 440.

Step 430: the CPU increments the accumulated number of confirmations NCj-1 for the previous area ARj-1 by "1", and increments the accumulated number of determinations NDj-1 for the previous area ARj-1 by "1".

Step 435: the CPU sets the value of the confirmation flag Xf to "0".

Whereas, if the value of the confirmation flag Xf is "0" when the CPU proceeds to step 425, the CPU makes a "No" determination at step 425, and proceeds to step 445. At step 445, the CPU increments the accumulated number of determinations NDj-1 for the previous area ARj-1 by "1", however, the CPU does not change the accumulated number of confirmations NCj-1 for the previous area ARj-1. Thereafter, the CPU proceeds to step 440.

At step 440, the CPU obtains the visual check probability Prj-1 (%) for the previous area ARj-1 by multiplying a "value (=NCj-1/NDj-1) obtained by dividing the accumulated number of confirmations NCj-1 by the accumulated number of determinations NDj-1" by 100 (i.e., Prj-1=100·(NCj-1/NDj-1)). Subsequently, the CPU proceeds to step 450 so as to store the visual check probability Prj-1 in the visual check probability database 60b while associating/correlating the visual check probability Prj-1 with the previous area ARj-1. In other words, the CPU updates (produces) the visual check probability database 60b by setting the "visual check probability corresponding to the area ARj-1 stored in the visual check probability database 60b" to the visual check probability Prj-1 obtained at step 440. Thereafter, the CPU executes the process of step 420, and proceeds to step 495 so as to terminate the present routine tentatively.

When an appropriate time comes, the CPU starts process of step 500 shown in FIG. 5 (so as to execute processes for performing the automatic cleaning), and sequentially executes "processes of step 505 and step 525" described below so as to proceed to step 530.

Step 505: the CPU obtains the position information (i.e., vehicle position information) of the vehicle SV at the present time point from the position information obtaining device 14.

Step 510: the CPU identifies/specifies the area ARj (in which the vehicle SV is traveling) that includes a "position of the vehicle SV at the present time point" indicated by the position information obtained at step 505 by searching the visual check probability database 60b.

Step 515: the CPU reads out (obtains) the visual check probability Prj corresponding to the identified area ARj from the visual check probability database 60b.

Step 520: the CPU obtains (sets) the cleaning threshold th by applying the visual check probability Prj obtained at step 515 to a first map Map 1 (refer to FIG. 5) that is a look-up table stored in the ROM. According to the first map Map 1, the cleaning threshold th is obtained in such a manner that the cleaning threshold th becomes greater as the visual check probability Prj becomes higher. In other words, according to the first map Map 1, the cleaning threshold th of when the visual check probability Prj is a particular value Prs is greater than the cleaning threshold th of when the visual check probability Prj is a value smaller than that particular value Prs.

Step 525: the CPU identifies the camera sensor whose detecting surface part is not being cleaned by the automatic cleaning. More specifically, the CPU identifies the camera sensor corresponding to the pump that is not being driven among the first pump 40 and the second pump 50.

When the CPU proceeds to step 530, the CPU determines whether or not the dirty degree indicating value of the thus identified camera sensor is greater than the cleaning threshold th. If both of the front camera 11 and the second camera 12 are identified at step 525 as the camera sensor having the detecting surface part that is not being cleaned by the automatic cleaning, the CPU determines whether or not the dirty degree indicating value of the front camera 11 is greater than the cleaning threshold th, and determines whether or not the dirty degree indicating value of the rear camera 12 is greater than the cleaning threshold th, at step 530. It should be noted that the CPU calculates (obtains through calculation) the dirty degree indicating value of the front camera 11 and the dirty degree indicating value of the rear camera 12, through executing an unillustrated routine every time a predetermined time elapses. However, the CPU stops calculating the dirty degree indicating value of the front camera 11 while the first pump 40 is being driven (i.e., during the execution of the automatic cleaning for the front camera 11). The CPU stops calculating the dirty degree indicating value of the rear camera 12 while the second pump 50 is being driven (i.e., during the execution of the automatic cleaning for the rear camera 12).

When there is at least one camera sensor whose dirty degree indicating value is larger than the cleaning threshold th, the CPU makes a "Yes" determination at step 530, and proceeds to step 535. At step 535, the CPU executes a process for driving the pump (the first pump 40 and/or the second pump 50) corresponding to the camera sensor whose dirty degree indicating value is determined to be larger than the cleaning threshold th for a predetermined time length. Namely, the CPU cleans (or executes the automatic clean process for) the detecting surface part of the camera sensor whose dirty degree indicating value is determined to be larger than the cleaning threshold th. Thereafter, the CPU proceeds to step 595 so as to terminate the present routine tentatively.

Whereas, when there is no camera sensor whose dirty degree indicating value is larger than the cleaning threshold th, the CPU makes a "No" determination at step 530, and proceeds to step 595 so as to terminate the present routine tentatively.

An example of the operation of the thus configured first cleaning apparatus will be described with reference to FIG. 6. In the example shown in FIG. 6, the visual check probability Prj corresponding to each of the areas ARj included in a section (straight section) between a point P0 and a point P1 is 10%. Therefore, while the vehicle SV is traveling in the section between the point P0 and the point P1, the cleaning threshold th is set at 3% that corresponds to the visual check probability Prj of 10%.

Figure 6:
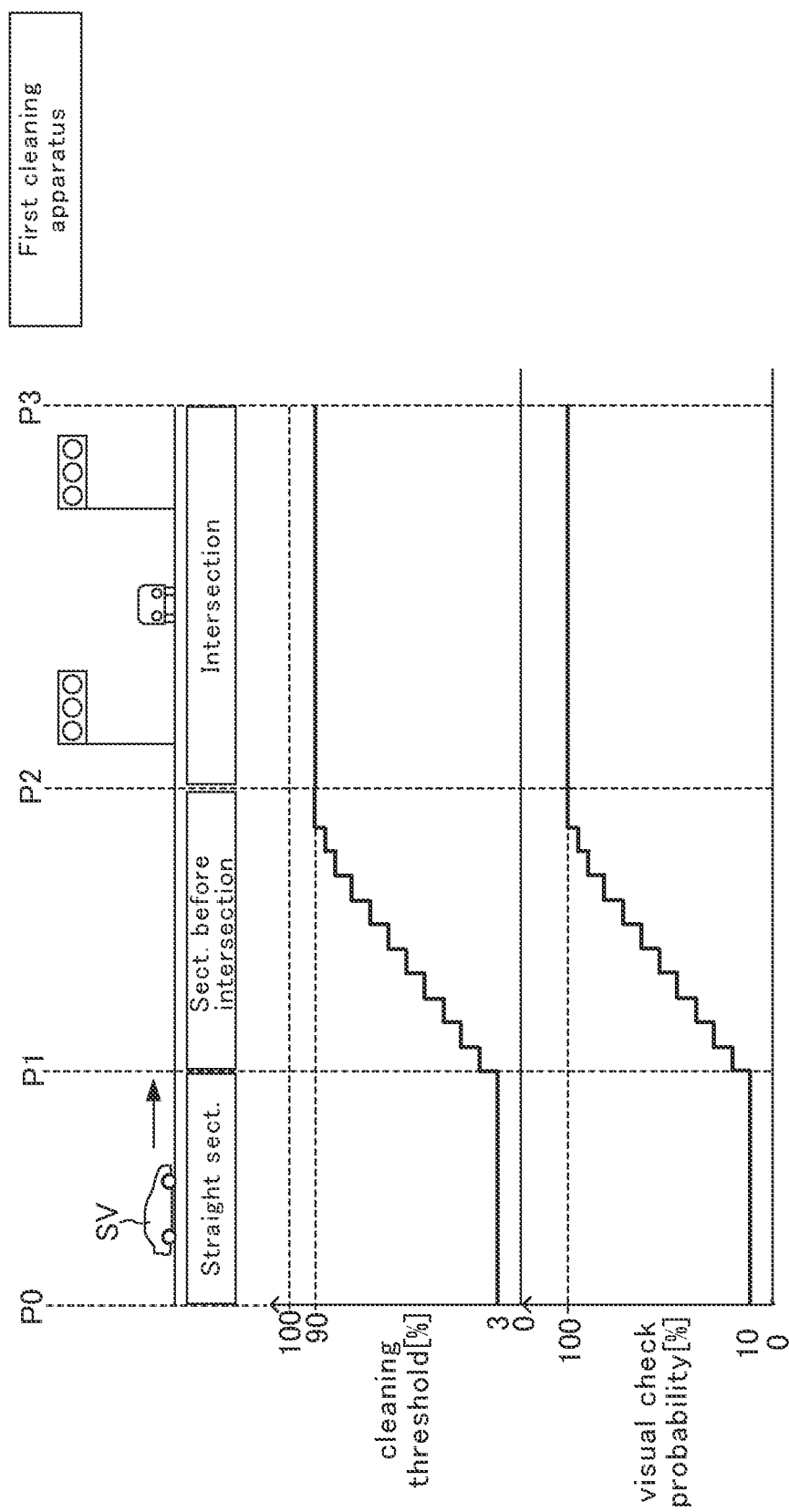
FIG. 6 is a figure for describing an outline of operations of the first cleaning apparatus.

In the example shown in FIG. 6, while the vehicle SV is traveling in a section (a section leading to (or before) an intersection) between the point P1 and a point P2, the visual check probability Prj becomes higher as the vehicle SV comes closer to the point P2. Therefore, while the vehicle SV is traveling from the point P1 to the point P2, the cleaning threshold th increases from 3% to 90%.

In addition, in the example shown in FIG. 6, the visual check probability Prj corresponding to each of the areas ARj included in a section (intersection section) between the point P2 and a point P3 is 100%. Therefore, while the vehicle SV is traveling in the section between the point P2 and the point P3, the cleaning threshold th is maintained at 90%.

Therefore, as understood from this example, the cleaning threshold th becomes greater, as the vehicle SV comes closer to the intersection that includes the areas ARj in each of which the visual check probability Prj is high. Accordingly, a possibility that the detecting surface part of the camera sensor is automatically cleaned by the automatic clean process becomes lower, as the vehicle SV comes closer to the intersection.

As has been described above, according to the first cleaning apparatus, a "possibility that the automatic clean process is executed when the vehicle SV is traveling in the areas ARj in each of which the visual check probability Prj is low" can be made high. Whereas, according to the first cleaning apparatus, a "possibility that the automatic clean process is executed when the vehicle SV is traveling in the areas ARj in each of which the visual check probability Prj is high" can be made low. Accordingly, when the vehicle SV is present in the areas ARj in each of which a "possibility that the driver visually checks the surrounding image displayed on the display so as to monitor/check the vehicle surroundings" is high, the automatic clean process is unlikely to be executed, and thus, a clear surrounding image can be displayed on the display.

<<Modification of the First Embodiment>>

The present modification is different from the first embodiment only in that the present modification updates the accumulated number of determinations NDj, the accumulated number of confirmations NCj, and the visual check probability Prj, every time a predetermined time elapses. More specifically, a CPU of the present modification executes routines shown by flowcharts illustrated in "FIG. 7 in place of FIG. 3" and in "FIG. 8 in place of FIG. 4".

Figure 7:
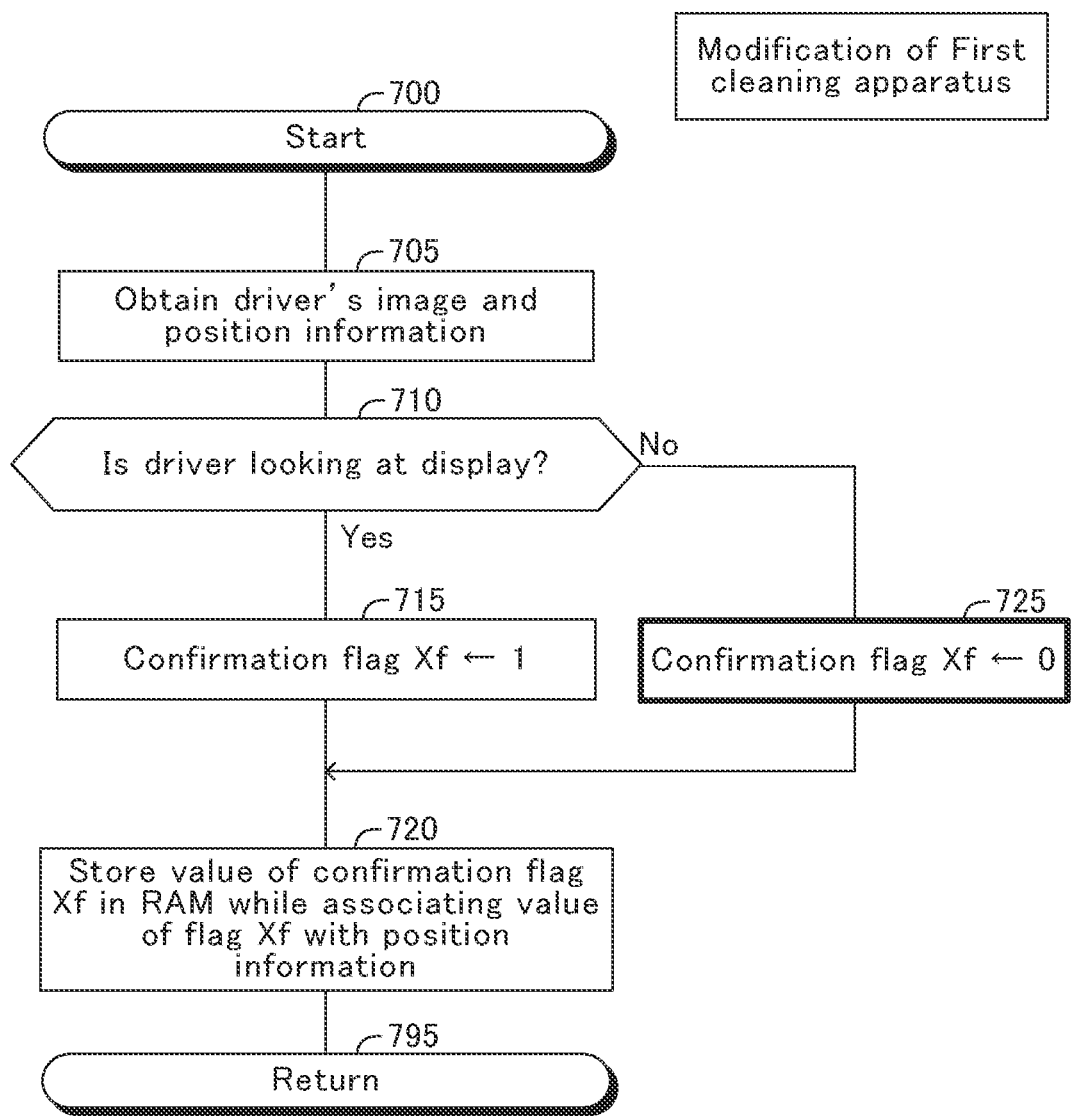
FIG. 7 is a flowchart showing a routine executed by a CPU of an ECU of a modification of the first cleaning apparatus.

Accordingly, when an appropriate time comes, the CPU starts process of step 700 shown in FIG. 7. Processes executed at step 705, step 710, step 715, and step 720 shown in FIG. 7 are the same as ones executed at step 305, step 310, step 315, and step 320 shown in FIG. 3, respectively. When the CPU makes a "No" determination at step 710 (i.e., when it is determined that the driver is not looking at the display), the CPU proceeds to step 725 so as to set the value of the confirmation flag Xf to "0". Thereafter, the CPU proceeds to step 720.

Figure 8:
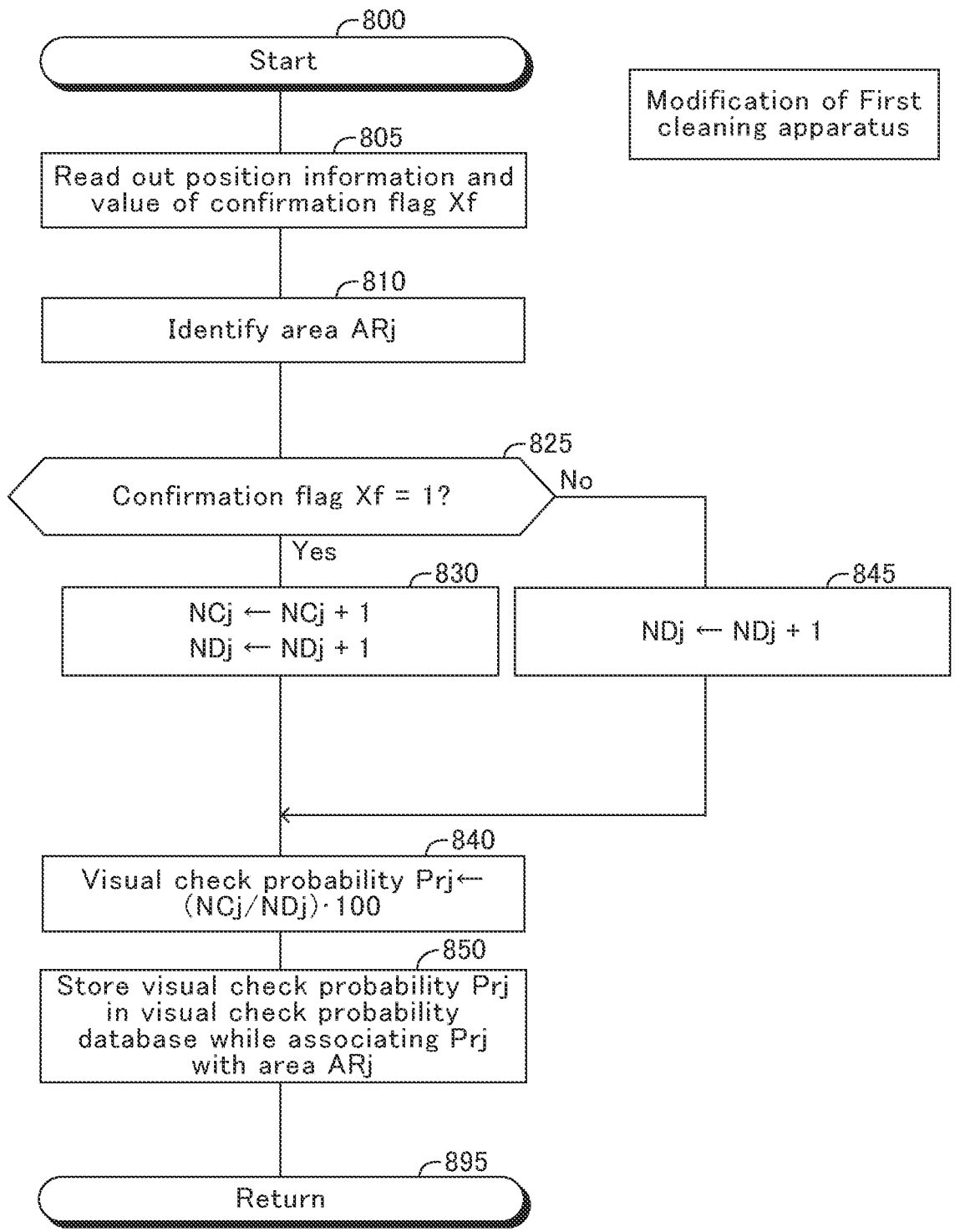
FIG. 8 is a flowchart showing a routine executed by the CPU of the ECU of the modification of the first cleaning apparatus.

The CPU starts process of step 800 shown in FIG. 8 after executing the routine shown in FIG. 7, and sequentially executes "the process of step 805 that is the same as one of step 405" and "the process of step 810 that is the same as one of step 410" so as to proceed to step 825. At step 825, the CPU determines whether the value of the confirmation flag Xf is "1".

When the value of the confirmation flag Xf is "1", the CPU makes a "Yes" determination at step 825, and proceeds to step 830. At step 830, the CPU increments the accumulated number of confirmations NCj for the present area ARj identified at step 810 by "1", and increments the accumulated number of determinations NDj for the present area ARj identified at step 810 by "1". Thereafter, the CPU proceeds to step 840.

Whereas, if the value of the confirmation flag Xf is "0" when the CPU proceeds to step 825, the CPU makes a "No" determination at step 825, and proceeds to step 845. At step 845, the CPU increments the accumulated number of determinations NDj for the present area ARj identified at step 810 by "1", however, the CPU does not change the accumulated number of confirmations NCj for the present area ARj identified at step 810. Thereafter, the CPU proceeds to step 840.

At step 840, the CPU obtains the visual check probability Prj (%) for the present area ARj by multiplying a "value (=NCj/NDj) obtained by dividing the accumulated number of confirmations NCj by the accumulated number of determinations NDj" by 100 (i.e., Prj=100·(NCj/NDj)). Subsequently, the CPU proceeds to step 850 so as to store the visual check probability Prj in the visual check probability database 60b while associating/correlating the visual check probability Prj with the present area ARj. In other words, the CPU updates (produces) the visual check probability database 60b by setting the "visual check probability corresponding to the area ARj stored in the visual check probability database 60b" to the visual check probability Prj obtained at step 840. Thereafter, the CPU proceeds to step 895 so as to terminate the present routine tentatively.

As has been described above, the present modification does not update any one of the accumulated number of confirmations NCj, the accumulated number of determinations NDj, and the visual check probability Prj, when the vehicle has entered the new area ARj. Instead, the present modification updates the accumulated number of confirmations NCj, the accumulated number of determinations NDj, and the visual check probability Prj, every time the determination (visual check determination) as to whether or not the driver is looking at the display is made. In other words, the visual check probability database 60b is updated every time the predetermined time elapses. Accordingly, the present modification can update the visual check probability Prj appropriately.

Second Embodiment

An on-board sensor cleaning apparatus (hereinafter, sometimes referred to as a "second cleaning apparatus") according to a second embodiment of the present disclosure is different from the first cleaning apparatus only in the following points.

Figure 9A:
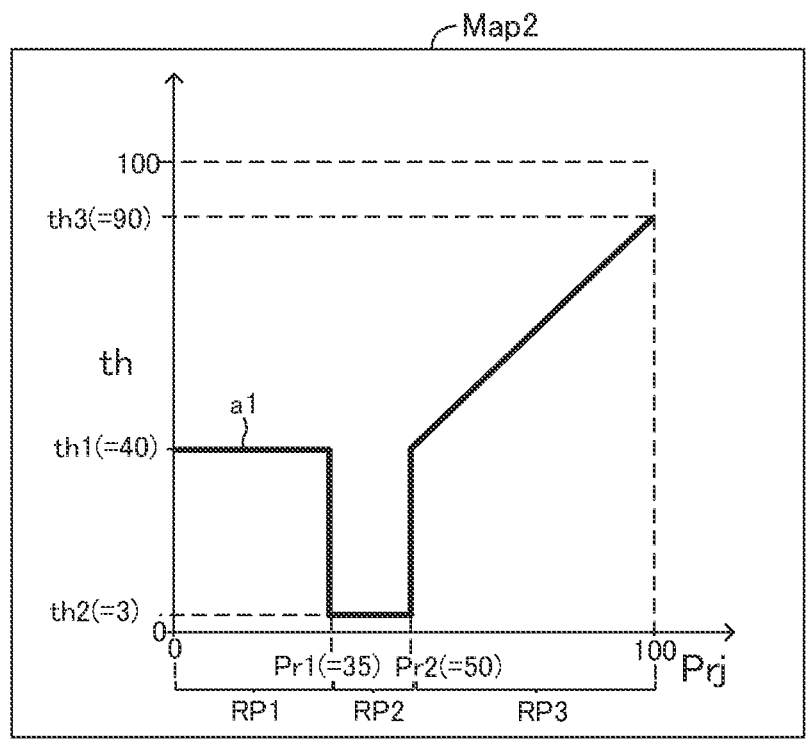
FIG. 9A is a figure for describing a second map Map2.
Figure 9B:
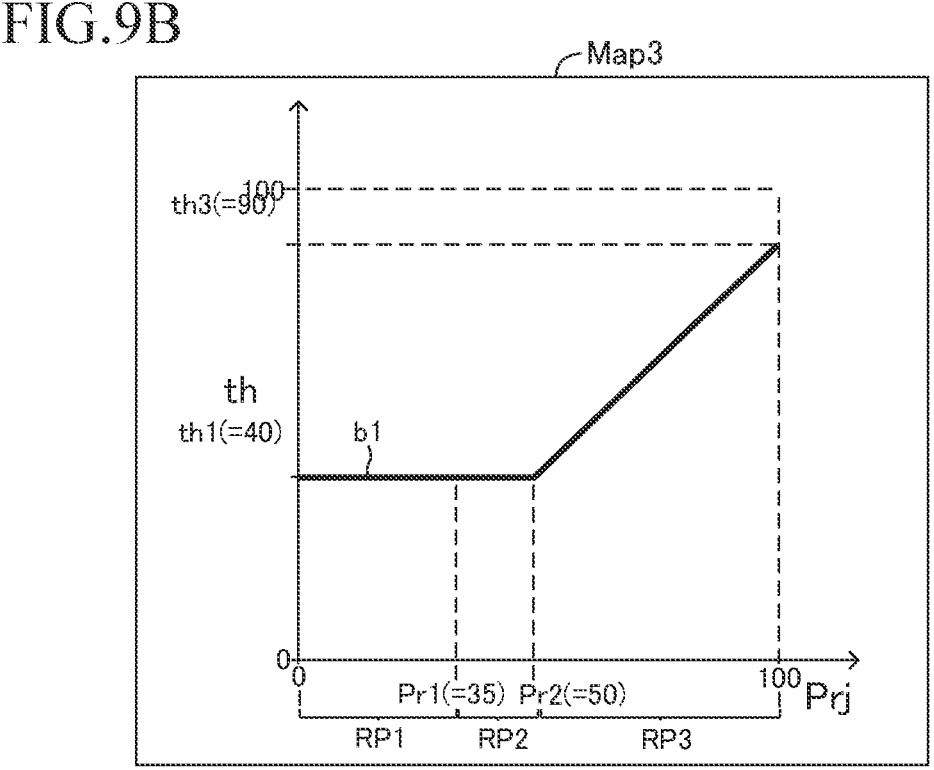
FIG. 9B is a figure for describing a third map Map3.

A second Map2 that is a look-up table shown in FIG. 9A and a third Map3 that is a look-up table shown in FIG. 9B have been stored in the ROM of the ECU 10, in place of the first map Map1.

The ECU 10 obtains the cleaning threshold th using (based on) the second map Map2, when the visual check probability Prj is apt to become higher while the vehicle SV is traveling (or owing to changes in the area Arj). Whereas, the ECU 10 obtains the cleaning threshold th using (based on) the second map Map3, when the visual check probability Prj is not apt to become higher while the vehicle SV is traveling (or owing to changes in the area Arj).

Hereinafter, these differences will be described mainly.
<Specific Operation>

Figure 4:
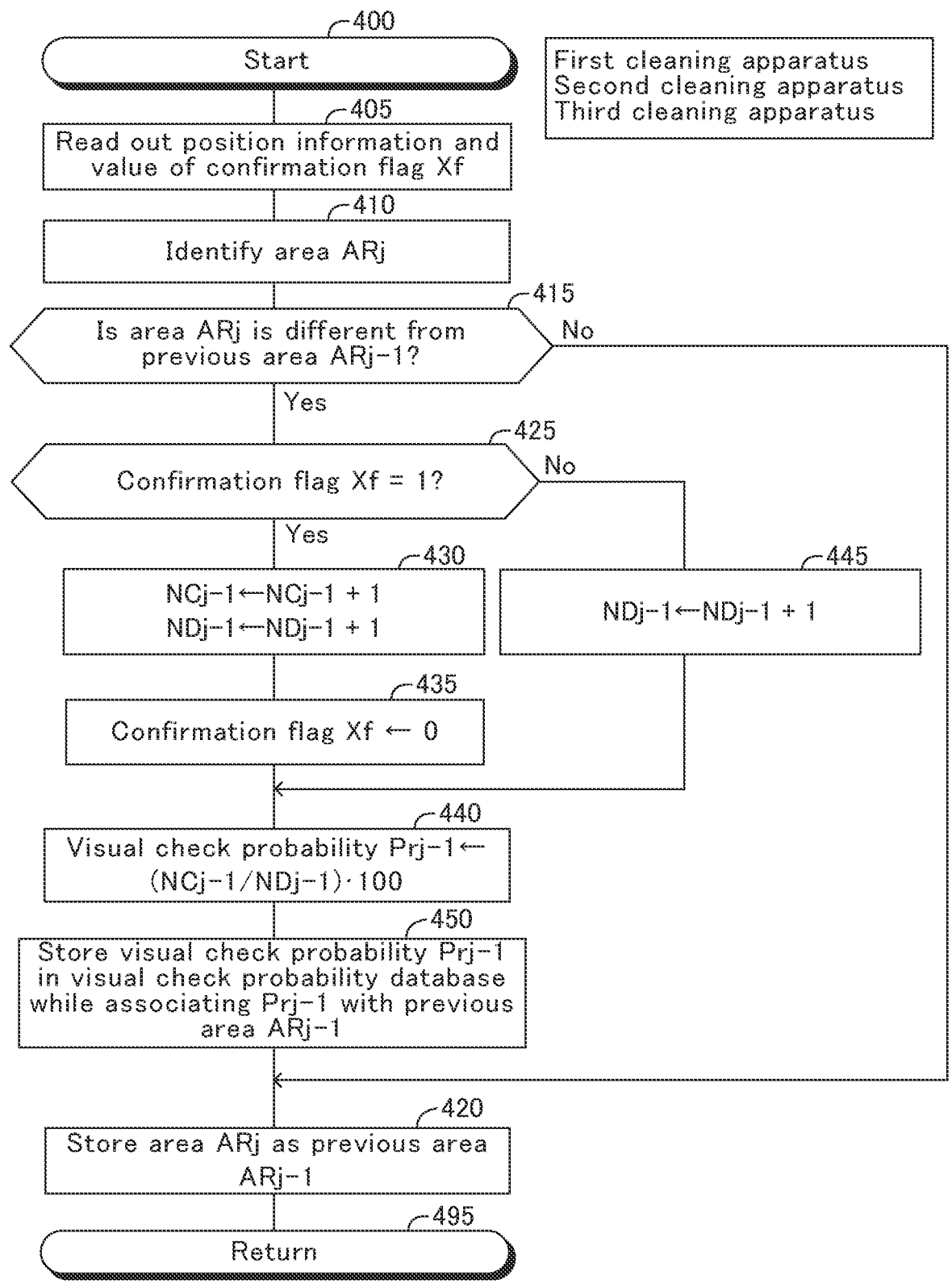
FIG. 4 is a flowchart showing a routine executed by the CPU of the ECU of each of the first to the third cleaning apparatus.

The CPU of the ECU 10 according to the second embodiment executes the routines shown by the flowcharts in FIGS. 3 and 4. Furthermore, the CPU executes a routine shown by a flowchart in FIG. 10 in place of FIG. 5, every time a predetermined time elapses. The descriptions of the routines shown in FIGS. 3 and 4 are omitted, since they have been already described. The descriptions of steps among steps shown in FIG. 10 that are the same as the steps shown in FIG. 5 are also omitted.

Figure 10:
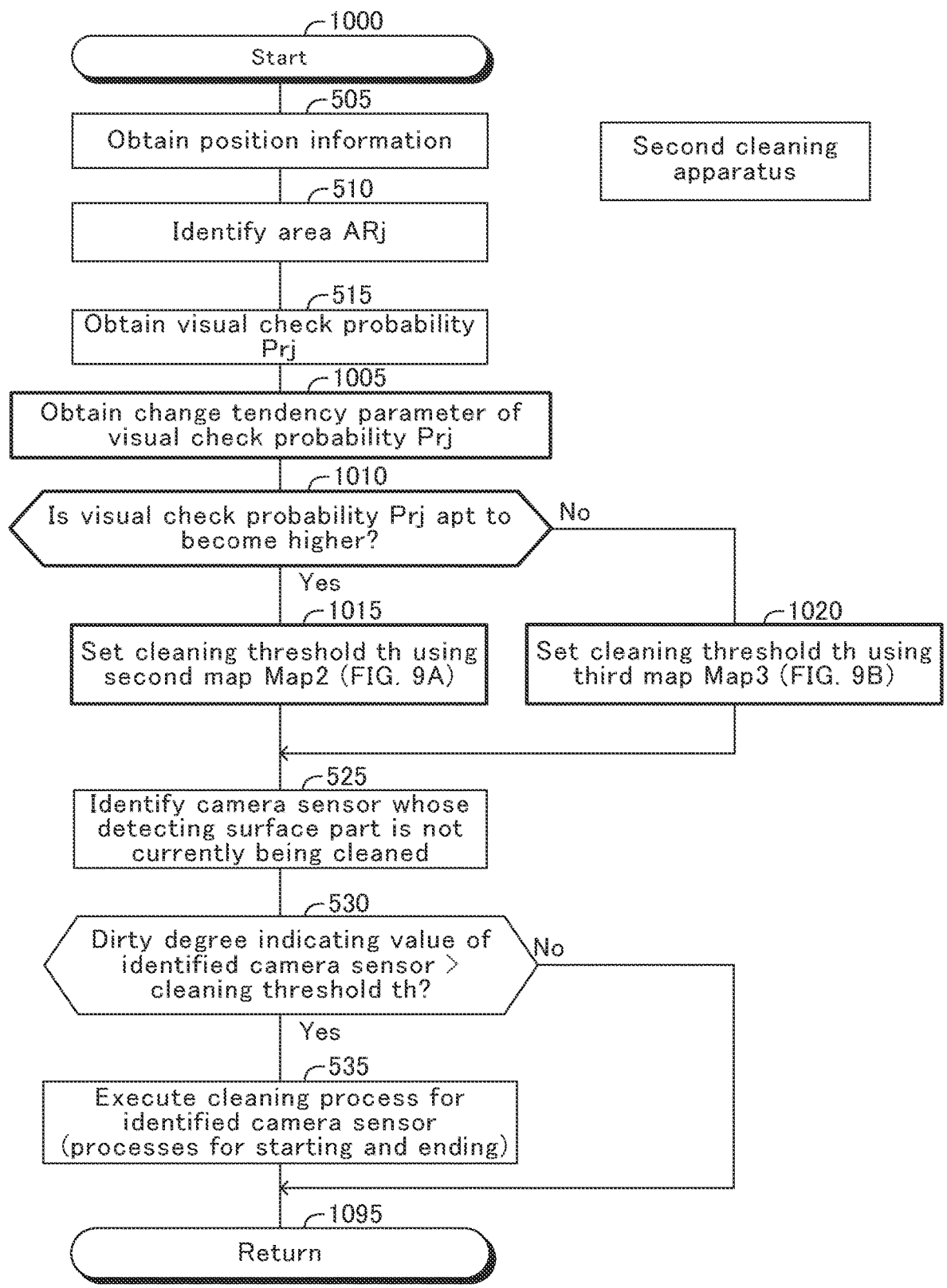
FIG. 10 is a flowchart showing a routine executed by the CPU of the ECU of the second cleaning apparatus.

The CPU starts process of step 1000 shown in FIG. 10, and sequentially executes the "processes from step 505 to step 515". Subsequently, the CPU proceeds to step 1005 so as to obtain a parameter (hereinafter, referred as a "change tendency parameter") indicating a tendency of changes in the visual check probability Prj.

More specifically, the CPU calculates (obtains through calculation) a change amount dPj of the visual check probability Prj in accordance with the following equation, every time an area where the vehicle SV is traveling changes from the previous area ARj-1 to the new (present) area ARj, by executing an unillustrated routine.

$dPj$=(visual check probability $Prj$)−(visual check probability $Prj$-1)

In the above equation, the visual check probability Prj is the visual check probability Prj corresponding to the new area ARj and stored in the visual check probability database 60b; and the visual check probability Prj-1 is the visual check probability Prj-1 corresponding to the previous area ARj-1 and stored in the visual check probability database 60b.

The CPU stores the thus obtained change amount dPj in the RAM as a present change amount dP(n).

In addition, at step 1005, the CPU reads out a one-time previous change amount dP(n−1) and a two-time previous change amount dP(n−2). The one-time previous change amount dP(n−1) is the change amount of the visual check probability obtained when the area where the vehicle SV was traveling changed from the area ARj-2 to the area ARj-1. The tow-time previous change amount dP(n−2) is the change amount of the visual check probability obtained when the area where the vehicle SV was traveling changed from the area ARj-3 to the area ARj-2.

Then, the CPU obtains, as the change tendency parameter K, an average value among the change amounts dP(n), dP(n−1), and dP(n−2) (i.e., K=(dP(n)+dP(n−1)+dP(n−2))/3). It should be noted that the number of the change amounts used to obtain the change tendency parameter K may be one, however, is more preferably two or more.

Subsequently, the CPU proceeds to step 1010 so as to determine whether or not the change tendency parameter K is equal to or greater than a positive predetermined value Kth in order to determine whether or not the visual check probability Prj is apt to (or tends to) become higher (rise/increase).

When the visual check probability Prj is apt to (or tends to) become higher (i.e., when the change tendency parameter K is equal to or greater than the value Kth), the CPU makes a "Yes" determination at step 1010, and proceeds to step 1015. At step 1015, the CPU applies the visual check probability Prj obtained at step 515 shown in FIG. 10 to the second map Map2 (refer to a solid line a1) shown in FIG. 9A so as to determine (obtain/set) the cleaning threshold th.

According to the second map Map2, the cleaning threshold th is maintained at a constant first threshold th1 when the visual check probability Prj is equal to or higher than "0" and is equal to or lower than a first probability Pr1 (namely, when the visual check probability Prj is in a first probability range RP1 between 0 and Pr1). It is preferable that the first probability Pr1 be a value equal to or higher than 20% and equal to or lower than 35%. In the present example, the first probability Pr1 is 35%. It is preferable that the first threshold th1 be a value equal to or higher than 10% and equal to or lower than 50% from a viewpoint of reducing the consumed amount of the cleaning fluid. In the present example, the first threshold th1 is 40%.

Furthermore, according to the second map Map2, the cleaning threshold th is maintained at a constant second threshold th2 when the visual check probability Prj is higher than the first probability Pr1 and is lower than a second probability Pr2 (namely, when the visual check probability Prj is in a second probability range RP2 between Pr1 and Pr2). The second probability Pr2 is higher than the first probability Pr1, and it is preferable that the second probability Pr2 be a value equal to or higher than 25% and equal to or lower than 50%. In the present example, the second probability Pr2 is 50%. The second threshold th2 is smaller than the first threshold th1, and is 3% in the present example.

In addition, according to the second map Map2, the cleaning threshold th is set to a value that becomes greater within a range that is larger than the first threshold th1 and is equal to or smaller than a third threshold th3 as the visual check probability Prj becomes higher, when the visual check probability Prj is equal to or higher than the second probability Pr2 and is equal to or lower than 100% (namely, when the visual check probability Prj is in a third probability range RP3 between Pr2 and 100%). It is preferable that the third threshold th3 is equal to or greater than 80% and is equal to or smaller than 95%. In the present example, the third threshold th3 is 90%.

As understood from the above, when the visual check probability Prj is in the second probability range RP2, the cleaning threshold th is set at a relatively small value (i.e., the second threshold th2) in the case where the visual check probability Prj is apt to increase, as compared to the case where the visual check probability Prj is not apt to increase (refer to FIG. 9B). Thus, when the visual check probability Prj is in the second probability range RP2 and is apt to increase, the chances that the automatic cleaning process is executed are great.

After executing the process of step 1015 shown in FIG. 10, the CPU executes some of the processes of step 525 to step 535, as described above, and then, proceeds to step 1095 so as to terminate the present routine tentatively.

In contrast, when the visual check probability Prj is not apt to (or tend to) become higher (i.e., when the change tendency parameter K is smaller than the value Kth), the CPU makes a "No" determination at step 1010, and proceeds to step 1020. At step 1020, the CPU applies the visual check probability Prj obtained at step 515 shown in FIG. 10 to the third map Map3 (refer to a solid line b1) shown in FIG. 9B so as to determine (obtain) the cleaning threshold th.

The third map Map3 is different from the second map Map2 only in that the third map Map3 sets the cleaning threshold th to the first threshold th1 when the visual check probability Prj is in the second probability range RP2. Accordingly, even when the visual check probability Prj is in the second probability range RP2, the cleaning threshold th is not set at the second threshold th2 that is relatively small, but is set at the first threshold th1, in the case where the visual check probability Prj is not apt to increase.

After executing the process of step 1020, the CPU executes some of the processes of step 525 to step 535, as described above, and then, proceeds to step 1095 so as to terminate the present routine tentatively.

Figure 11:
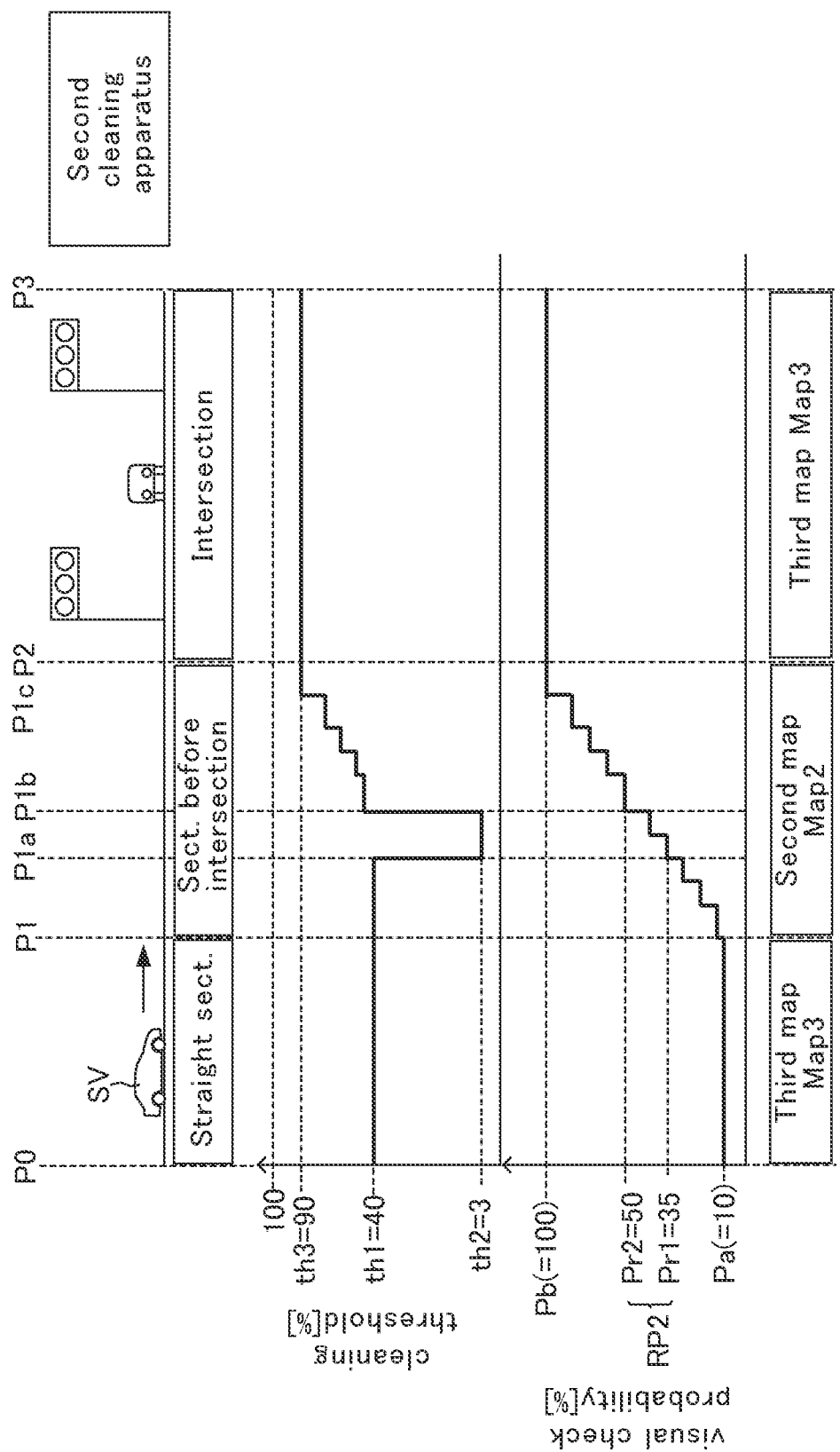
FIG. 11 is a figure for describing an outline of operations of the second cleaning apparatus.

An example of the operation of the thus configured second cleaning apparatus will be described with reference to FIG. 11. In the example shown in FIG. 11, when the vehicle SV is traveling in a section between a point P0 and a point P1, the visual check probability Prj is constant and thus does not increase. Therefore, in this case, the cleaning threshold th is set at the first threshold th1 (=40%) based on the third map Map3. In the example, when the vehicle SV is traveling in a section between the point P1 and a point P2, the visual check probability Prj is determined to be apt to increase. Therefore, in this case, the cleaning threshold th is set/obtained based on the second map Map2. Especially, when the vehicle SV is traveling in a section between a point P1a and a point P1b, the visual check probability Prj is higher than the first probability Pr1 and is lower than the second probability Pr2, and therefore, the cleaning threshold th is set at 3% that is the second threshold th2. Accordingly, the chances that the automatic cleaning process is executed are great in the section between the point P1a and the point P1b. Subsequently, when the visual check probability Prj does not increase (namely, when the vehicle SV is traveling in a section between the point P2 and a point P3), the cleaning threshold th is set based on the third map Map 3.

As has been described above, according to the second cleaning apparatus, when it is determined that the visual check probability Prj is not apt to increase, the cleaning threshold th is kept at a relatively great value (e.g., 40%), and thus, a frequency that the automatic clean process is executed becomes low. Accordingly, in this case, the consumed amount of the cleaning fluid can be reduced. In addition, according to the second cleaning apparatus, when it is determined that the visual check probability Prj is apt to increase, the cleaning threshold th is set to the second threshold th2 that is the extremely small value (e.g., 3%) in a period before the visual check probability Prj becomes very high (i.e., in a period in which the visual check probability Prj is higher than the first probability Pr1 and is lower than the second probability Pr2). Accordingly, the automatic cleaning process can often/easily be executed in a period before the visual check probability Prj is likely to become very high. Furthermore, when the visual check probability Prj is very high, the cleaning threshold th is set at the third threshold th3 (e.g., 90%) that is extremely high. Therefore, in this case, the chances that the automatic cleaning process is executed are lowered.

Third Embodiment

Similarly to the first cleaning apparatus, an on-board sensor cleaning apparatus (hereinafter, sometimes referred to as a "third cleaning apparatus") according to a third embodiment of the present disclosure sets the cleaning threshold th in such a manner that the cleaning threshold th becomes greater as the visual check probability Prj becomes higher. Note, however, the third cleaning apparatus is different from the first cleaning apparatus only in that the third cleaning apparatus sets the cleaning threshold th at a maximum value so that the automatic cleaning process is prevented from starting and stops the automatic cleaning process that is being executed, while it is determined that the driver is looking at the display. In other words, the third cleaning apparatus prohibits executing the automatic cleaning process, while it is determined that the driver is looking at the display.

<Specific Operation>

The CPU of the ECU 10 according to the third embodiment executes the routines shown by the flowcharts in FIGS. 7 and 8. Furthermore, the CPU executes a routine shown by a flowchart in FIG. 12 in place of FIG. 5, every time a predetermined time elapses. The descriptions of the routines shown in FIGS. 7 and 8 are omitted, since they have been already described. The descriptions of steps among steps shown in FIG. 12 that are the same as the steps shown in FIG. 5 are also omitted. The routine shown in FIG. 12 is different from the routine shown in FIG. 5 only in that step 1205, step 1210, and step 1215 are added.

Figure 12:
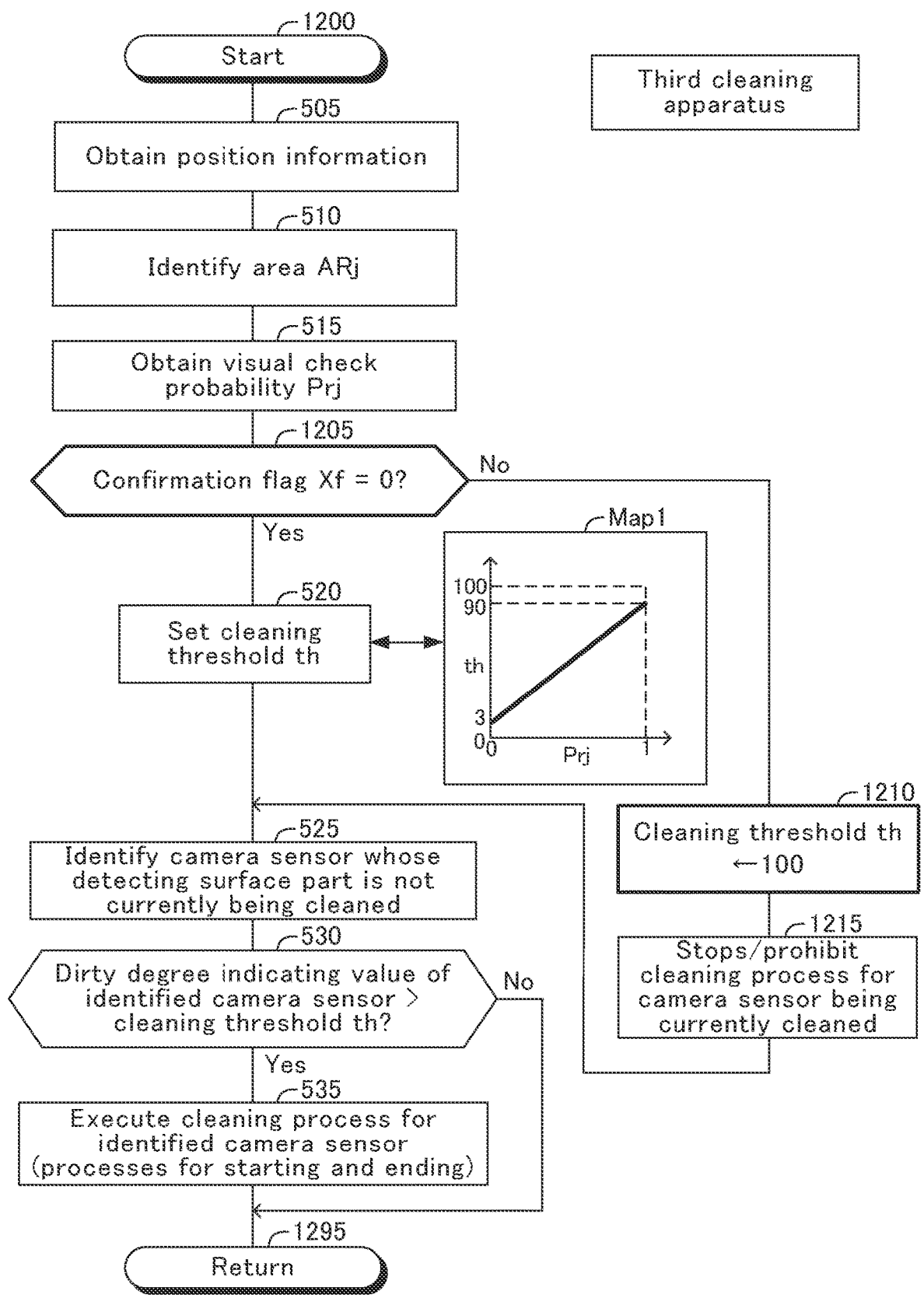
FIG. 12 is a flowchart showing a routine executed by the CPU of the ECU of the third cleaning apparatus.

The CPU starts process of step 1200 shown in FIG. 12, and sequentially executes the "processes from step 505 to step 515". Subsequently, the CPU proceeds to step 1205 so as to determine whether or not the value of the confirmation flag Xf is "0".

When the value of the confirmation flag Xf is "0", the CPU makes a "Yes" determination at step 1205, and proceeds to step 520. As described above, the CPU obtains (sets) the cleaning threshold th at step 520, and executes the processes of step 525 and steps following step 525.

Whereas, when the value of the confirmation flag Xf is "1", the CPU makes a "No" determination at step 1205, and executes processes of step 1210 and step 1215 as described below. Thereafter, the CPU executes the processes of step 525 and steps following step 525.

Step 1210: the CPU sets the cleaning threshold th at the maximum value (i.e., 100% in this example) corresponding to the maximum value of the dirty degree indicating value. This prohibits the CPU from making a "Yes" determination at step 530, and therefore, executing the automatic cleaning process does not start (or is prohibited).

Step 1215: when there is a camera sensor whose detecting surface part is being cleaned by the automatic cleaning (and/or by a manual cleaning based on an operation to an unillustrated manual switch), the CPU stops cleaning for the camera sensor (prohibits the cleaning process). More specifically, the CPU stops driving the first pump 40 if the first pump 40 is being driven, and the CPU stops driving the second pump 50 if the second pump 50 is being driven.

Figure 13:
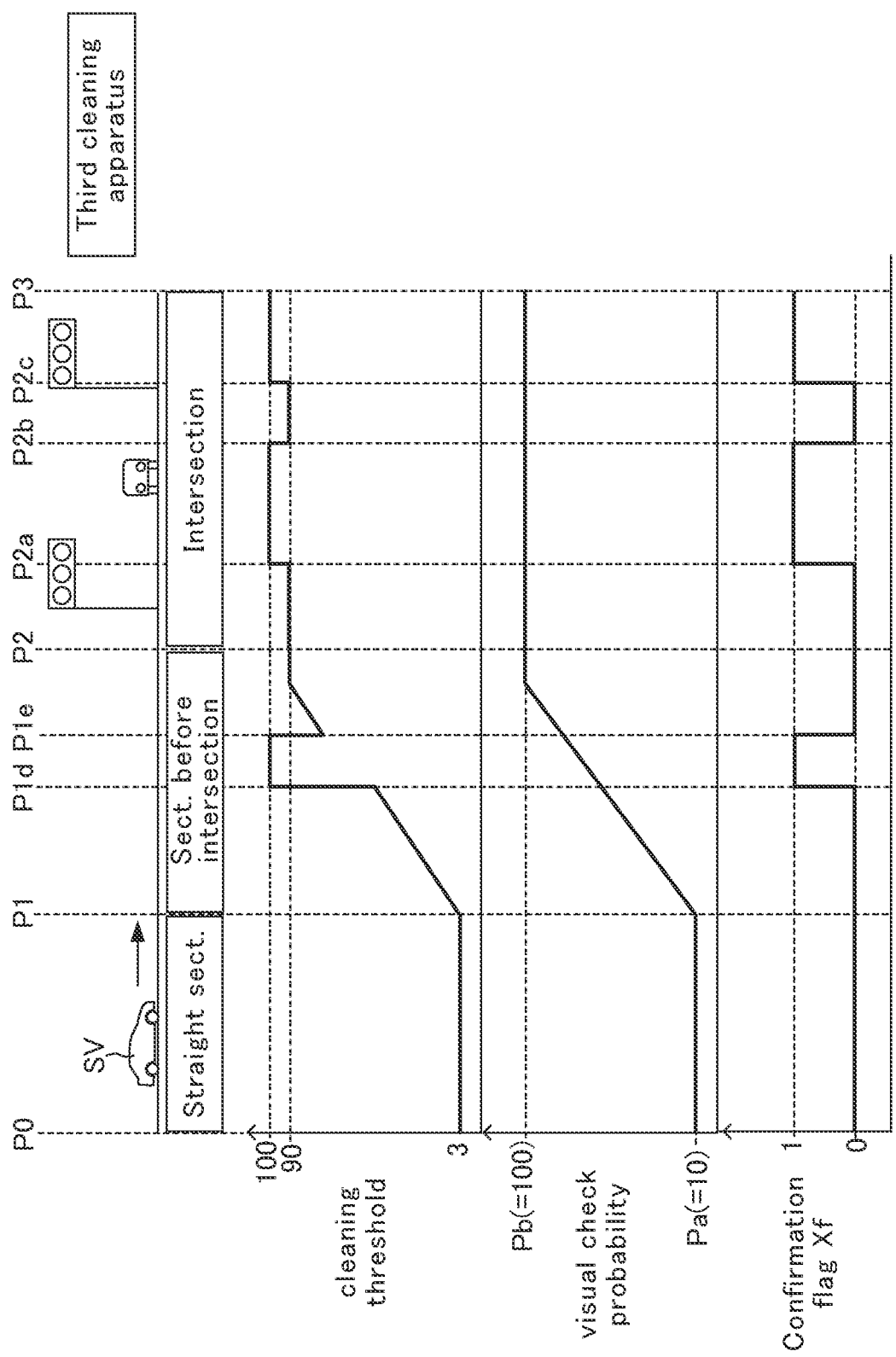
FIG. 13 is a figure for describing an outline of operations of the third cleaning apparatus.

An example of the operation of the thus configured third cleaning apparatus will be described with reference to FIG. 13. It should be noted that the visual check probability Prj and the cleaning threshold th are drawn in such a manner that they continuously change, for simplicity. In the example shown in FIG. 13, it is determined that the driver is not looking at the display (namely, confirmation flag Xf=0), when the vehicle SV drives in any of a section between a point P0 and a point P1*d*, a section between a point P1*e* and a point P2*a*, and a section between a point P2*b* and a point P2*c*. Accordingly, when the vehicle SV is traveling in these sections, the third cleaning apparatus operates similarly to the first cleaning apparatus.

Whereas, it is determined that the driver is looking at the display (namely, confirmation flag Xf=1), when the vehicle SV drives in any of a section between the point P1*d* and the point P1*e*, a section between the point P2*a* and the point P2*b*, and a section between the point P2*c* and a point P3. Accordingly, when the vehicle SV is traveling in these sections, the third cleaning apparatus sets the cleaning threshold th to the value (100% in the present example) corresponding to the maximum value of the dirty degree indicating value, stops driving the first pump 40 to stop cleaning using the first pump 40 if the first pump 40 is being driven, and stops driving the second pump 50 to stop cleaning using the second pump 50 if the second pump 50 is being driven.

According to the third cleaning apparatus, the automatic cleaning for the camera sensor is not executed so that there is no injection of the cleaning fluid to the detecting surface part that would cause the surrounding image to be blurred, while the driver is looking at the surrounding image displayed on the display. Therefore, the driver can visually check the "surrounding image which is not blurred" so as to monitor/check the vehicle surroundings.

The present disclosure is not limited to the above embodiments, but may employ various modifications within the scope of the present disclosure.

Figure 14:
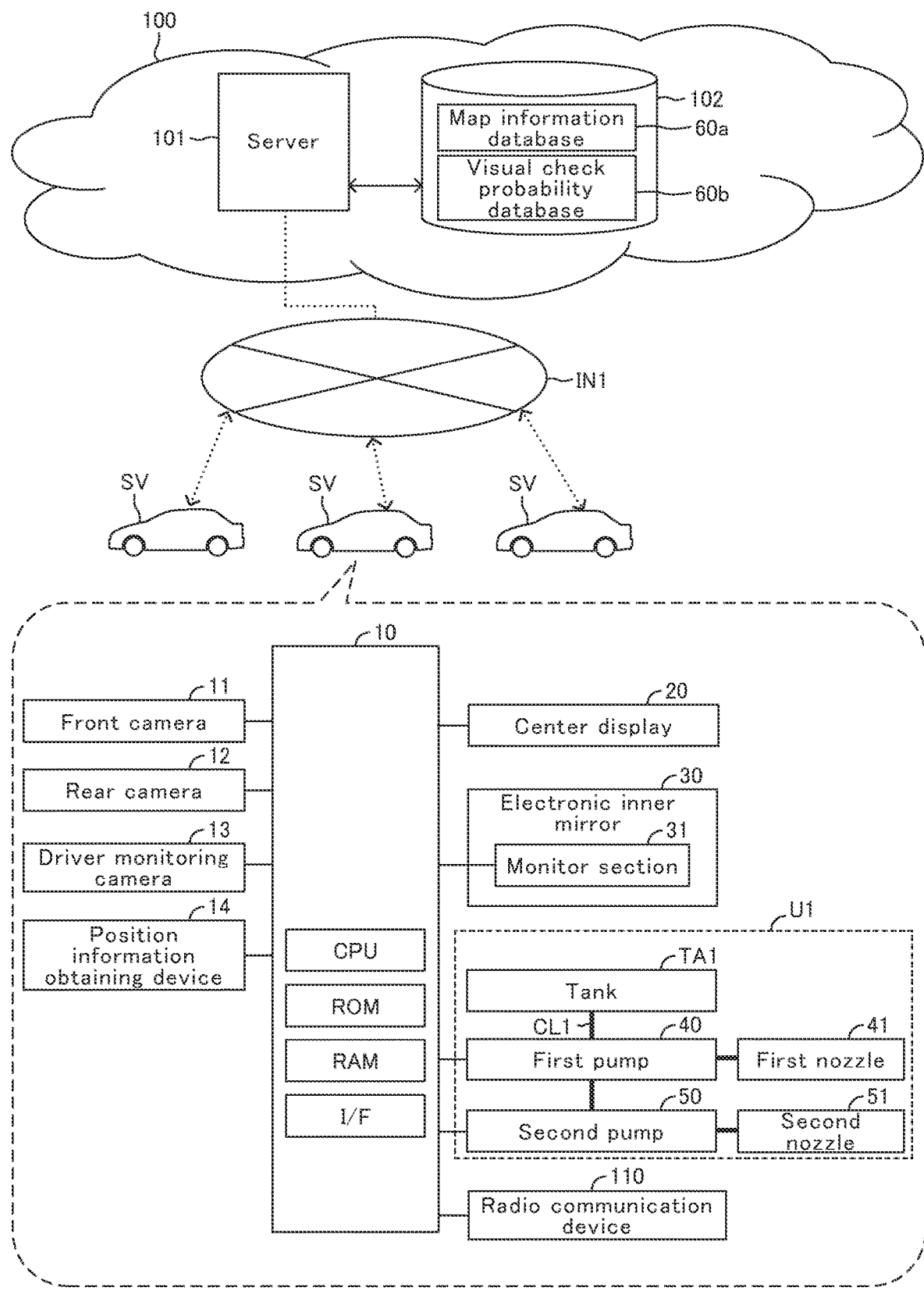
FIG. 14 is a schematic diagram of an on-board sensor cleaning system according to an embodiment of the present disclosure.

For example, in each of the embodiments, the visual check probability database 60*b* may be arranged in a cloud 100, as shown in FIG. 14. The cloud 100 is connected with a plurality of vehicles SV through a communication link IN1 (e.g., an internet link) so as to be able to exchange information (data) between the cloud 100 and the vehicles. Hereinafter, each of the first to third cleaning apparatus is simply referred to as a "cleaning apparatus".

The cloud 100 includes a server 101 and a storage device 102. The server 101 includes a computer. The storage device 102 includes the map information database 60*a* and the visual check probability database 60*b*. The server 101 can conduct a search for specific data stored in each of the databases in the storage device 102 and retrieve the data from each of the databases in the storage device 102. The server 101 can also write/store data in each of the databases in the storage device 102.

The cleaning apparatus mounted on the vehicle SV includes a radio communication device 110. The radio communication device 110 is a radio communication terminal configured to exchange information with the cloud 100 through the communication link IN1.

In the above system shown in FIG. 14, the CPU of the ECU 10 executes the routine shown in FIG. 7. Note, however, the CPU executes a process for transmitting a data set including "the value of the confirmation flag Xf and the position information associated the value of the confirmation flag Xf" to the cloud 100 using the radio communication device 110, after executing the process of step 720 show in FIG. 7.

When the server 101 has received the above-described data set from any one of the vehicles SV, the server 101 executes the processes shown in the routine of FIG. 8. Especially, at step 850, the server 101 associates the visual check probability Prj with the area ARj, and store the visual check probability Prj in the visual check probability database 60*b* in the cloud 100.

Figure 5:
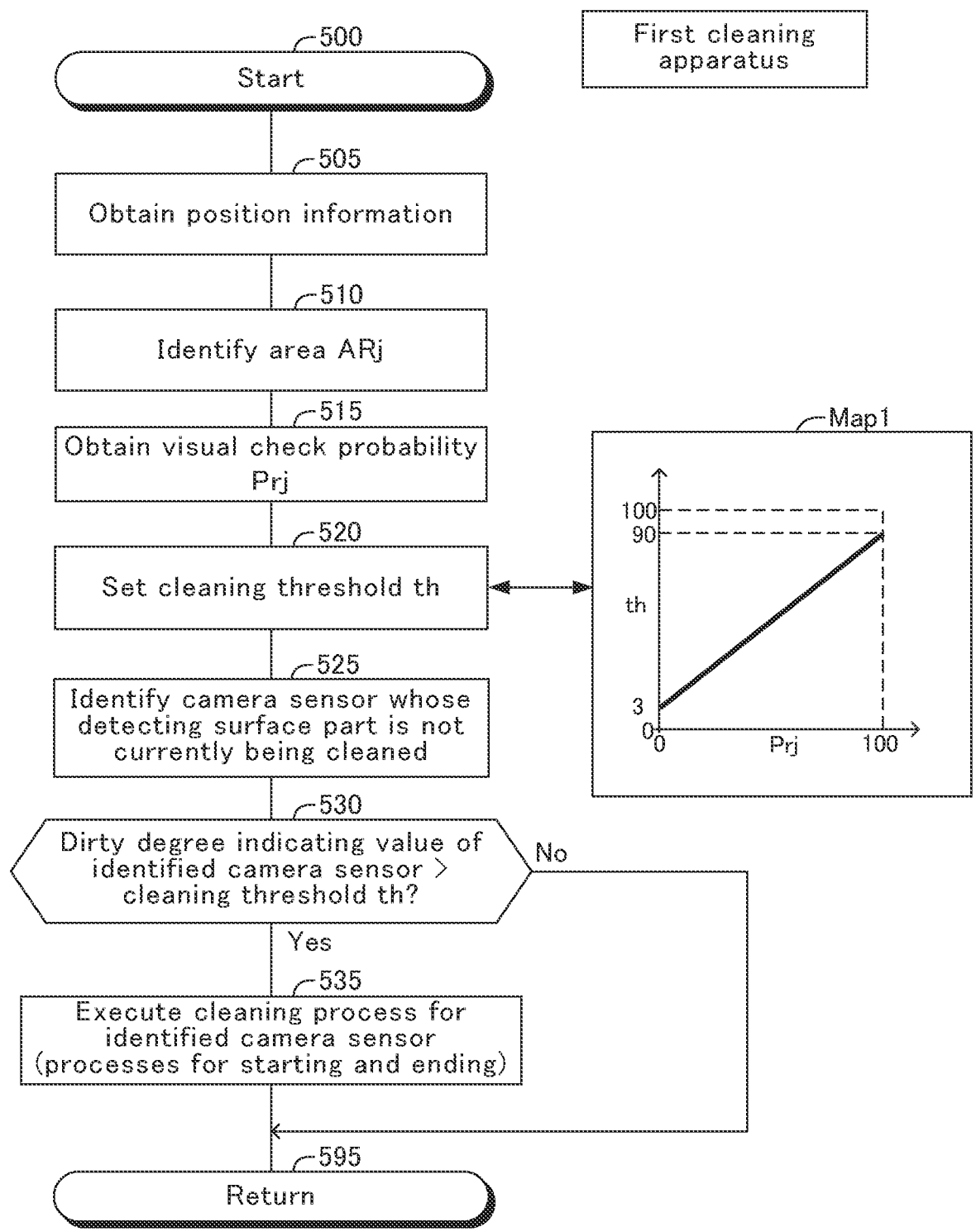
FIG. 5 is a flowchart showing a routine executed by the CPU of the ECU of the first cleaning apparatus.

In addition, at step 515 in each of the routines shown in FIGS. 5, 10, and 12, the CPU of the ECU 10 transmits a data set of the present area ARj of the vehicle SV and a vehicle ID for identifying that vehicle SV to the cloud 100. When the server 101 of the cloud 100 has received the data set of the present area ARj and the vehicle ID, the server 101 reads out the visual check probability Prj corresponding to the received present area ARj from the visual check probability database 60*b*. Thereafter, the server 101 transmits the thus read out visual check probability Prj to the vehicle identified by the received vehicle ID. The CPU of the ECU 10 of that vehicle receives the visual check probability Prj transmitted from the server 101 at step 515.

It should be noted that the server 101 may include the first map Map1, or a set of the second map Map2 and the third map Map3. In this case, the server 101 may determine the cleaning threshold th using these maps, in the similar way that the ECU 10 of the above-described cleaning apparatus of the embodiments does. In this configuration, the server 101 transmits the cleaning threshold th to the vehicle identified by the vehicle ID. The ECU 10 of that vehicle receives the cleaning threshold th, and executes the processes from step 525 to step 535 using the thus received cleaning threshold th.

Alternatively, in the case where the server 101 includes the first map Map1, or a set of the second map Map2 and the third map Map3, and determines the cleaning threshold th using these maps, in the similar way that the ECU 10 of the above-described cleaning apparatus of the embodiments does, the server 101 may be configured to:

obtain, from the vehicle SV, "the vehicle ID, and either the vehicle position information or the present area ARj" of that vehicle SV, and the dirty degree indicating value of the camera sensor of that vehicle SV;

obtain the visual check probability Prj;

obtain (specify, determine) the cleaning threshold th based on the visual check probability Prj;

make a determination of whether or not the dirty degree indicating value has become larger than the cleaning threshold th (i.e., determine whether the automatic cleaning start condition has become satisfied); and transmit the result of the determination to the vehicle SV identified by the vehicle ID.

In this case, the ECU 10 of the vehicle SV executes the automatic clean process when the received result of the determination indicates that the automatic cleaning start condition has become satisfied.

The vehicle may comprise a "camera for monitoring dirty degree" that can take an image of the detecting surface part of the camera sensor. In this case, the dirty degree indicating value may be obtained by analyzing the image of the detecting surface part. Alternatively, the dirty degree indicating value may be obtained according to a known method.

In the above-described embodiments, the ease of satisfaction of the automatic cleaning start condition (how easy the automatic cleaning start condition becomes satisfied) is varied by varying the cleaning threshold th based on the visual check probability Prj. Alternatively, the ease of satisfaction of the automatic cleaning start condition may be varied by correcting/varying the dirty degree indicating value based on the visual check probability Prj. In this case, the dirty degree indicating value is corrected/varied in such a manner that the dirty degree indicating value becomes smaller while the cleaning threshold th is maintained at a constant value, under conditions that the cleaning threshold th becomes high in the above-described embodiments, and it is determined that the automatic cleaning start condition becomes satisfied when the corrected dirty degree indicating value becomes greater than the cleaning threshold th that is maintained at the constant value. Further alternatively, the ease of satisfaction of the automatic cleaning start condition may be varied by varying both of the cleaning threshold th and the dirty degree indicating value, based on the visual check probability Prj.

The above-described embodiments may be applied to another on-board sensor cleaning apparatus configured to include an on-board sensor other than the camera sensor and a cleaning unit for cleaning a detecting surface part of that another on-board sensor, and configured to display information obtained based on information detected by that another on-board sensor on the display. Examples of the on-board sensor other than the camera sensor may be a sensor configured to receive "sonic wave or electromagnetic wave" that passes through a detecting surface part of the sensor that is exposed to the outside of the vehicle. In this case, the electromagnetic wave received by the sensor may include visible light, laser light, infrared light, and electrical wave in millimeter waveband. The sonic wave received by the sensor may include electromagnetic wave.

The front camera 11 may be disposed on a front windshield in the side of the cabin of the vehicle SV, and be configured to obtain the front image data utilizing visible light passing through the front windshield. In this case, the detecting surface part of the front camera 11 is a part (window part) of the front windshield through which the visible light passes that is input to the front camera 11.

Similarly, the rear camera 12 may be disposed on a rear glass in the side of the cabin of the vehicle SV, and be configured to obtain the rear image data utilizing visible light passing through the rear glass. In this case, the detecting surface part of the rear camera 12 is a part (window part) of the rear glass through which the visible light passes that is input to the rear camera 12.

What is claimed is:

1. An on-board sensor cleaning apparatus, applied to a vehicle including an on-board sensor configured to obtain information representing surroundings of said vehicle based on electromagnetic wave or sonic wave which passes through a detecting surface part exposed to outside of said vehicle and a display device configured to display an image or displayed information produced based on said information obtained by said on-board sensor, comprising:

a cleaning unit configured to perform a cleaning process to clean said detecting surface part of said on-board sensor using cleaning fluid;

a position information obtaining device configured to obtain vehicle position information indicating a position of said vehicle; and a control unit configured to:
obtain a result of a determination of whether or not an automatic cleaning start condition is satisfied, wherein said determination is made, using a storage device which has stored a piece of area position information capable of identifying a position of each of predetermined areas on a ground and a visual check probability correlating value correlated with a visual check probability that a driver of said vehicle visually checks said display device while said piece of area position information and said visual check probability correlating value being associated with each other, based on said visual check probability correlating value which corresponds to one of said areas which includes said position of said vehicle indicated by said vehicle position information obtained by said position information obtaining device; and control said cleaning unit in such a manner that said cleaning unit performs said cleaning process when said result of said determination indicates that said automatic cleaning start condition is satisfied.

2. The on-board sensor cleaning apparatus according to claim 1, wherein, said storage device is mounted on said vehicle; and said control unit is configured to:
obtain, based on said obtained vehicle position information, said visual check probability correlating value corresponding to one of said areas which includes said position of said vehicle, from said storage device; and obtain said result of said determination, by setting said automatic cleaning start condition based on said obtained visual check probability correlating value, and by determining whether or not said automatic cleaning start condition becomes satisfied.

3. The on-board sensor cleaning apparatus according to claim 2, wherein, said on-board sensor is a camera sensor which is configured to take a picture of said surroundings of said vehicle using light as said electromagnetic wave to obtain image information as said information representing said surroundings of said vehicle; and said control unit is configured to:
obtain, based on said image information, a dirty degree indicating value indicating a degree of dirtiness of said detecting surface part of said on-board sensor; and
determine whether or not said automatic cleaning start condition becomes satisfied by comparing said dirty degree indicating value and a cleaning threshold,
and wherein,
said control unit is configured to:
set said cleaning threshold based on said obtained visual check probability correlating value so as to set said automatic cleaning start condition; and
obtain said result of said determination which is indicating that said automatic cleaning start condition has become satisfied when said dirty degree indicating value is larger than said cleaning threshold.

4. The on-board sensor cleaning apparatus according to claim 3, wherein,
said control unit is configured to vary said cleaning threshold in such a manner that said cleaning threshold is greater when said obtained visual check probability correlating value is a specific value than when said obtained visual check probability correlating value is smaller than said specific value, so as to set said automatic cleaning start condition.

5. The on-board sensor cleaning apparatus according to claim 3, wherein,
said control unit is configured to vary said cleaning threshold so as to set said automatic cleaning start condition in such a manner that:
said cleaning threshold is equal to a first threshold when said obtained visual check probability correlating value is in a first range that is equal to or smaller than a first visual check probability correlating value; and
said cleaning threshold is equal to a second threshold smaller than said first threshold when said obtained visual check probability correlating value is in a second range that is larger than said first visual check probability correlating value and smaller than a second visual check probability correlating value, and a change in said visual check probability correlating value indicates a tendency that said visual check probability correlating value is increasing.

6. The on-board sensor cleaning apparatus according to claim 1, further comprising a radio communication device which is mounted on said vehicle and is configured to be capable of communicating with an information-processing equipment which is located outside of said vehicle and which includes said storage device,
wherein,
said control unit is configured to:
obtain, based on said obtained vehicle position information, said visual check probability correlating value corresponding to one of said areas which includes said position of said vehicle, from said storage device, by communicating with said information-processing equipment using said radio communication device; and
obtain said result of said determination, by setting said automatic cleaning start condition based on said obtained visual check probability correlating value, and by determining whether or not said automatic cleaning start condition becomes satisfied.

7. The on-board sensor cleaning apparatus according to claim 6, wherein, said on-board sensor is a camera sensor which is configured to take a picture of said surroundings of said vehicle using light as said electromagnetic wave to obtain image information as said information representing said surroundings of said vehicle; and
said control unit is configured to:
obtain, based on said image information, a dirty degree indicating value indicating a degree of dirtiness of said detecting surface part of said on-board sensor; and
determine whether or not said automatic cleaning start condition becomes satisfied by comparing said dirty degree indicating value and a cleaning threshold,
and wherein,
said control unit is configured to:
sett said cleaning threshold based on said obtained visual check probability correlating value so as to set said automatic cleaning start condition; and
obtain said result of said determination which is indicating that said automatic cleaning start condition has become satisfied when said dirty degree indicating value is larger than said cleaning threshold.

8. The on-board sensor cleaning apparatus according to claim 7, wherein,
said control unit is configured to vary said cleaning threshold in such a manner that said cleaning threshold is greater when said obtained visual check probability correlating value is a specific value than when said obtained visual check probability correlating value is smaller than said specific value, so as to set said automatic cleaning start condition.

9. The on-board sensor cleaning apparatus according to claim 7, wherein,
said control unit is configured to vary said cleaning threshold so as to set said automatic cleaning start condition in such a manner that:
said cleaning threshold is equal to a first threshold when said obtained visual check probability correlating value is in a first range that is equal to or smaller than a first visual check probability correlating value; and
said cleaning threshold is equal to a second threshold smaller than said first threshold when said obtained visual check probability correlating value is in a second range that is larger than said first visual check probability correlating value and smaller than a second visual check probability correlating value, and a change in said visual check probability correlating value indicates a tendency that said visual check probability correlating value is increasing.

10. The on-board sensor cleaning apparatus according to claim 1, further comprising a driver's information obtaining device configured to obtain driver's information that is used for determining a state of said driver,
wherein,
said control unit is configured to:
prohibit executing said cleaning process while it is determined, based on said driver's information, that said driver is visually checking said display device.

11. The on-board sensor cleaning apparatus according to claim 1, further comprising a driver's information obtaining device configured to obtain driver's information that is used for determining a state of said driver, wherein, said control unit is configured to:

make a visually-check-determination as to whether or not said driver has visually checked said display device, based on said driver's information;

identify one of said areas that includes a position at which a result of said visually-check-determination is obtained;

calculate said visual check probability correlating value for said identified one of said areas, based on said result of said visually-check-determination; and store said calculated visual check probability correlating value in said storage device while associating said calculated visual check probability correlating value with said area position information indicating said identified one of said areas.

12. An on-board sensor cleaning method, applied to a vehicle including:

an on-board sensor configured to obtain information representing surroundings of said vehicle based on electromagnetic wave or sonic wave which passes through a detecting surface part exposed to outside of said vehicle;

a display device configured to display an image or displayed information produced based on said information obtained by said on-board sensor;

a cleaning unit configured to perform a cleaning process to clean said detecting surface part of said on-board sensor using cleaning fluid; and a position information obtaining device configured to obtain vehicle position information indicating a position of said vehicle, comprising:

a step of obtaining a visual check probability correlating value corresponding to one of areas which includes a position of said vehicle indicated by said vehicle position information, using a storage device which has stored a piece of area position information capable of identifying a position of each of predetermined areas on a ground and a visual check probability correlating value correlated with a visual check probability that a driver of said vehicle visually checks said display device while said piece of area position information and said visual check probability correlating value being associated with each other;

a step of setting an automatic cleaning start condition based on said obtained visual check probability correlating value;

a step of obtaining a result of a determination of whether or not said automatic cleaning start condition becomes satisfied; and a step of controlling said cleaning unit in such a manner that said cleaning unit performs said cleaning process when said result of said determination indicates that said automatic cleaning start condition is satisfied.

13. The on-board sensor cleaning method according to claim 12, further comprising:

a step of obtaining driver's information that is used for determining a state of said driver;

a step of making a visually-check-determination as to whether or not said driver has visually checked said display device, based on said driver's information, and of identifying one of said areas that includes a position at which a result of said visually-check-determination is obtained;

a step of calculating said visual check probability correlating value for said identified one of said areas, based on said result of said visually-check-determination; and a step of storing said calculated visual check probability correlating value in said storage device while associating said calculated visual check probability correlating value with said area position information indicating said identified one of said areas.

* * * * *